(12) United States Patent
Mino

(10) Patent No.: US 7,468,759 B2
(45) Date of Patent: Dec. 23, 2008

(54) METHOD, APPARATUS AND RECORDING MEDIUM FOR IMAGE PROCESSING

(75) Inventor: Kazuhiro Mino, Kaisei-machi (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 11/413,139

(22) Filed: Apr. 28, 2006

(65) Prior Publication Data
US 2006/0192898 A1 Aug. 31, 2006

Related U.S. Application Data

(62) Division of application No. 09/639,804, filed on Aug. 17, 2000, now Pat. No. 7,068,328.

(30) Foreign Application Priority Data
Aug. 17, 1999 (JP) ............................. 1999-230731
Jun. 9, 2000 (JP) ............................. 2000-173279

(51) Int. Cl.
*H04N 5/14* (2006.01)

(52) U.S. Cl. ................. 348/672; 348/437.1; 348/438.1; 348/687; 382/302; 382/274

(58) Field of Classification Search ................. 348/672, 348/630–631, 638–639, 644–646, 671, 673–675, 348/686–687, 678, 708, 712; 382/302, 132, 382/274, 128, 240, 398; *H04N 5/14*
See application file for complete search history.

(56) References Cited

U.S. PATENT DOCUMENTS

| 4,642,683 A | 2/1987 | Alkofer |
| 4,695,884 A | 9/1987 | Anastassiou et al. |
| 5,109,282 A | 4/1992 | Peli |
| 5,265,200 A | 11/1993 | Edgar |
| 5,526,446 A | 6/1996 | Adelson et al. |
| 5,604,820 A | 2/1997 | Ono |
| 5,604,823 A | 2/1997 | Ono |
| 5,619,593 A | 4/1997 | Ono |

(Continued)

FOREIGN PATENT DOCUMENTS

JP 62-500756 A 3/1987

(Continued)

*Primary Examiner*—Trang U Tran
(74) *Attorney, Agent, or Firm*—Birch, Stewart, Kolasch & Birch, LLP

(57) ABSTRACT

The sense of contrast perceived by a viewer of an image is quantified and adequate image processing is carried out on image data based on the sense of contrast. Contrast-sense quantification means generates unsharp image data of the image data and then generates a histogram of the unsharp image data. Since the histogram of the image data includes lightness information of details of the image, a distribution width thereof does not represent the contrast perceived by the viewer of the image as a whole. However, since the histogram of the unsharp image data excludes information of the details, a distribution width of the unsharp image data represents the contrast of the overall image. The distribution width of the histogram of the unsharp image data is found as the sense of contrast and input to processing means. In the processing means, tone conversion processing is carried out on the image data by changing a tone conversion LUT based on the sense of contrast, and processed image data are obtained.

27 Claims, 20 Drawing Sheets

U.S. PATENT DOCUMENTS

| | | |
|---|---|---|
| 5,740,274 A | 4/1998 | Ono et al. |
| 5,743,266 A | 4/1998 | Levene et al. |
| 5,751,831 A | 5/1998 | Ono |
| 5,786,906 A | 7/1998 | Shishizuka |
| 5,878,165 A | 3/1999 | Ono |
| 5,933,524 A | 8/1999 | Schuster et al. |
| 5,960,123 A | 9/1999 | Ito |
| 6,388,679 B1 | 5/2002 | Kluck et al. |
| 6,411,740 B1 * | 6/2002 | Daly .......................... 382/251 |
| 7,068,328 B1 * | 6/2006 | Mino .......................... 348/672 |

FOREIGN PATENT DOCUMENTS

| | | |
|---|---|---|
| JP | 4-84930 A | 3/1992 |
| JP | 4-90676 A | 3/1992 |
| JP | 6-245113 A | 9/1994 |
| JP | 6332399 A | 12/1994 |
| JP | 7193766 | 7/1995 |
| JP | 7-284126 A | 10/1995 |
| JP | 8-313823 A | 11/1996 |
| JP | 9-44657 A | 2/1997 |
| JP | 9-503085 A | 3/1997 |
| WO | WO-86/06902 A1 | 11/1986 |
| WO | WO-95/09403 A1 | 4/1995 |

* cited by examiner

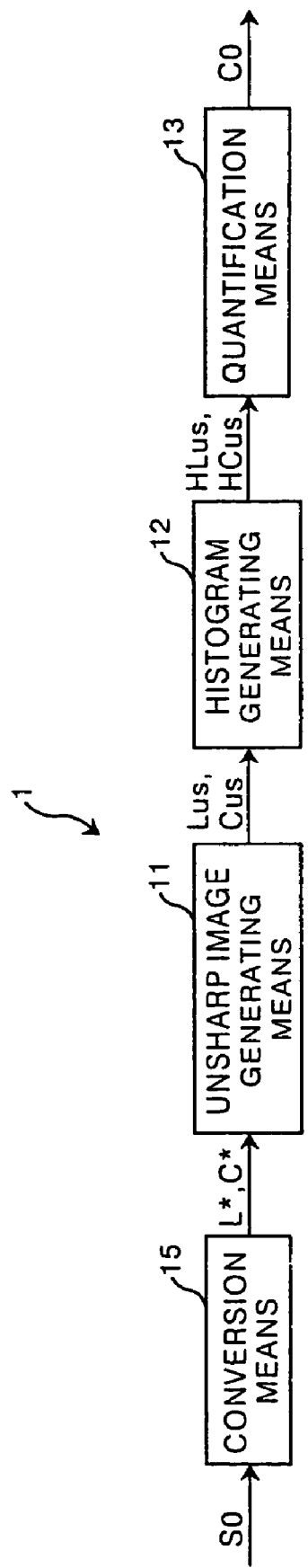

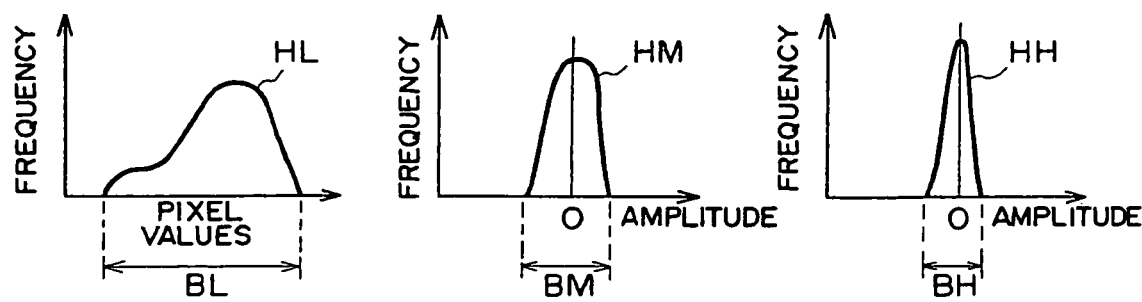
F I G . 16

METHOD, APPARATUS AND RECORDING MEDIUM FOR IMAGE PROCESSING

CROSS-REFERENCE TO RELATED APPLICATION

The present application is a divisional application of application Ser. No. 09/639,804 filed on Aug. 17, 2000, now U.S. Pat. No. 7,068,328. The present application also claims priority to Japanese Patent Application No. 230731/1999, filed Aug. 17, 1999 and Japanese Patent Application No. 173279/2000, filed Jun. 9, 2000, the entire contents which are hereby incorporated by reference.

BACKGROUND OF THE INVENTION

1. Field of the Invention

The present invention relates to a method and an apparatus for quantifying a sense of contrast of an image perceived by a viewer and for carrying out image processing on image data based on the sense of contrast having been quantified. The present invention also relates to a computer-readable recording medium storing a program to cause a computer to execute the image processing method.

2. Description of the Related Art

Reproduction of digital image data obtained by a digital camera or by reading an image recorded on a film as a softcopy on a display device or a hardcopy such as a print has been carried out. In the case where digital image data are reproduced as has been described above, various kinds of image processing such as tone processing and frequency processing has been carried out on image data so as to cause the quality of the reproduced image to be as high as that of a print generated from a negative film.

For example, a histogram of image data is generated and contrast of an image represented by the image data is found by a distribution width of the histogram. By correcting a tone curve for converting a tone of the image data based on the contrast having been found, the image data are converted so that a tone does not become flat or noise becomes inconspicuous. Various kinds of such image processing methods have been proposed (Japanese Unexamined Patent Publication No. 6(1994)-253176, for example). The contrast here means a ratio of a dark portion of an image to a light portion of the image. Therefore, the contrast of an image can be judged by the distribution width of a histogram. If the histogram distribution width is wide, the image has sharp contrast while the image has weak contrast if the distribution width is narrow. For example, an image obtained by photographing in fine weather has a wide histogram reflecting a dark portion in the shade and a light portion in the sunlight. If an image is obtained by photographing in cloudy weather, the histogram becomes narrow due to poor distinction between the sunlight and shade.

Another image processing method for quantifying a sense of sharpness or graininess of an image perceived by a viewer and for changing the content of image processing based on the sense of contrast having been quantified in order to generate a preferable image has also been proposed (Japanese Unexamined Patent Publication No. 7(1995)-193766).

The histogram generated from image data has a complex shape since the histogram includes various kinds of information of all subjects or every detail in an image. Therefore, information of the contrast perceived by a viewer of the image is buried in the complex shape, and the histogram does not necessarily reflect the viewer's sense of contrast. For example, in the case of an image having a human face as a subject thereof, a viewer of the image perceives the contrast only in the face and not for subjects other than the face in the image. However, since a histogram generated from image data includes information regarding the subjects other than the face, this histogram does not reflect the contrast perceived by the viewer. Therefore, if image processing is carried out on the image data based on such a histogram, a processed image desired by the viewer is not necessarily obtained.

The sense of contrast perceived by a viewer becomes different between the cases of sharp colors and dull colors included in an image. For example, an image having sharp colors therein is perceived as an image having sharp contrast while an image including colors which are not so sharp is perceived as an image having weak contrast. Therefore, since the sense of contrast becomes different due to colors included in an image, image processing considering the colors of an image needs to be carried out.

The present invention has been conceived based on consideration of the above problems. An object of the present invention is therefore to provide a method and an apparatus for quantifying a sense of contrast perceived by a viewer of an image and for carrying out adequate image processing on the image based on the sense of contrast, and also to provide a computer-readable recording medium storing a program to cause a computer to execute the image processing.

Another object of the present invention is to provide a method and an apparatus for carrying out adequate image processing on an image by using color information of the image, and also to provide a computer-readable recording medium storing a program to cause a computer to execute the image processing.

SUMMARY OF THE INVENTION

When a viewer observes an image and judges the contrast thereof, the contrast is judged based on not only a shade difference of all subjects as a whole but also information not reflected in a histogram, such as a shade difference of the entire image, distributions of dark and light portions therein, a distribution of lightness only in a subject of interest, and the like. The present invention has been conceived by paying attention to this fact.

In other words, a first image processing method of the present invention is characterized by the fact that the sense of contrast of an image represented by image data is quantified based on the image data.

The "sense of contrast" herein referred to means a subjective sense regarding contrast of an image perceived by a viewer and not directly reflected in a histogram of the image itself, such as a shade difference of the entire image, a distribution of dark and light portions in the image, and a lightness distribution only in a subject of interest. More specifically, the sense of contrast can be quantified based on a histogram of unsharp image data of the image data, information of positions of a light portion and/or a dark portion in an unsharp image represented by the unsharp image data, and a histogram or the like obtained by multi-resolution image data in each of frequency bands generated by conversion of the image data into multiple resolutions, for example.

Although the histogram can be generated from the unsharp image data themselves, the histogram may be generated from unsharp image data converted into 32-bit numbers, hexadecimal numbers or octal numbers when the image data has 8-bit (256) information, for example.

Furthermore, luminance data and color data representing luminance information and color information of an image may be obtained from the image data. Unsharp luminance image data and/or unsharp color image data which are unsharp image data of the luminance data and/or the color data are then generated. A luminance histogram and/or a color histogram are generated from the unsharp luminance image data and/or the unsharp color image data, and based on the luminance histogram and/or the color histogram, the sense of contrast may be quantified. The "color information" refers to information representing sharpness of a color included in an image.

When the unsharp color image data are generated, a color histogram representing a two-dimensional frequency distribution of the unsharp color image data may be used.

Moreover, as the "position information of a light portion and/or a dark portion", standard deviation of a distance from the center of an image to the light portion and/or the dark portion can be used.

A phrase stating "based on the histogram or the like obtained from multi-resolution image data" refers to the case of quantification of the sense of contrast based on a rough lightness distribution of an image found by a low-frequency band image represented by image data at a resolution in a low frequency band generated from image data, and based on a histogram of a medium-frequency band image or a high-frequency band image represented by image data at a resolution of a medium frequency band or a resolution of a high frequency band generated from the image data, for example.

The luminance data and the color data representing the luminance information and the color information of an image may be obtained from image data. The luminance data and the color data are then converted into multiple resolutions so that multi-resolution luminance image data and multi-resolution color image data in a plurality of frequency bands are obtained. The sense of contrast may be quantified based on luminance histograms and/or color histograms which are histograms of the multi-resolution luminance image data and the multi-resolution color image data.

In the first image processing method of the present invention, it is preferable for image processing to be carried out on the image data based on the sense of contrast.

In this case, it is preferable for the image processing to be at least one of tone conversion processing, frequency enhancing processing, AE processing and chroma conversion processing.

A second image processing method of the present invention is characterized by the fact that image processing for changing luminance information of an image is carried out on image data based on color information of the image represented by the image data.

In the second image processing method of the present invention, it is preferable for the image processing to be carried out on the image data according to the steps of:

obtaining color data representing color information of the image from the image data;

generating unsharp image data of the color data;

generating a histogram of the unsharp image data; and carrying out the image processing on the image data based on the histogram.

In this case, a histogram representing a two-dimensional frequency distribution of the unsharp image data is preferably generated.

In the second image processing method of the present invention, it is preferable for the image processing to be carried out according to the steps of:

obtaining color data representing color information of the image based on the image data;

obtaining multi-resolution image data in a plurality of frequency bands by converting the color data into multiple resolutions;

generating a histogram of multi-resolution data in a lowermost frequency band out of the multi-resolution image data in the plurality of frequency bands; and carrying out the image processing on the image data based on the histogram.

A first image processing apparatus of the present invention is characterized by the fact that the apparatus has contrast-sense quantification means for quantifying a sense of contrast of an image represented by image data, based on the image data.

In the first image processing apparatus of the present invention, it is preferable for the contrast-sense quantification means to comprise:

unsharp image data generating means for generating unsharp image data of the image data;

histogram generating means for generating a histogram of the unsharp image data; and quantification means for quantifying the sense of contrast based on the histogram.

In the first image processing apparatus of the present invention, it is preferable for the contrast-sense quantification means to comprise:

conversion means for obtaining luminance data and color data representing luminance information and color information of the image from the image data;

unsharp image data generating means for generating unsharp luminance image data and/or unsharp color image data which are unsharp image data of the luminance data and/or the color data;

histogram generating means for generating a luminance histogram and/or a color histogram which are histograms of the unsharp luminance image data and/or the unsharp color image data; and quantification means for quantifying the sense of contrast based on the luminance histogram and/or the color histogram.

In the case where the unsharp image data generating means generates the unsharp color image data, it is preferable for the histogram generating means to generate a color histogram representing a two-dimensional frequency distribution of the unsharp color image data.

Furthermore, it is preferable for the contrast-sense quantification means to comprise:

unsharp image data generating means for generating unsharp image data of the image data; and quantification means for quantifying the sense of contrast based on position information of a light portion and/or a dark portion in an unsharp image represented by the unsharp image data.

It is also preferable for the contrast-sense quantification means to comprise:

multi-resolution conversion means for obtaining multi-resolution image data in a plurality of frequency bands by converting the image data into multiple resolutions;

histogram generating means for generating a histogram of the multi-resolution image data; and quantification means for quantifying the sense of contrast based on the histogram.

Furthermore, it is also preferable for the contrast-sense quantification means to comprise:

conversion means for obtaining luminance data and/or color data representing luminance information and/or color information from the image data;

multi-resolution conversion means for obtaining multi-resolution luminance data and/or multi-resolution color data in a plurality of frequency bands by converting the luminance data and/or the color data into multiple resolutions;

histogram generating means for generating a luminance histogram and/or a color histogram which are histograms of the multi-resolution luminance image data and/or the multi-resolution color image data; and quantification means for quantifying the sense of contrast based on the luminance histogram and/or the color histogram.

It is preferable for the first image processing apparatus of the present invention to further comprise processing means for carrying out image processing on the image data based on the sense of contrast.

In this case, it is preferable for the processing means to carry out, as the image processing, at least one of tone conversion processing, frequency enhancing processing, AE processing, and chroma conversion processing.

A second image processing apparatus of the present invention is characterized by the fact that image processing for changing luminance information of an image represented by image data is carried out on the image data based on color information of the image.

It is preferable for the second image processing apparatus of the present invention to comprise:

conversion means for obtaining color data representing the color information from the image data;

unsharp image data generating means for generating unsharp image data of the color data;

histogram generating means for generating a histogram of the unsharp image data; and processing means for carrying out the image processing on the image data based on the histogram.

It is preferable for the histogram generating means to generate a histogram representing a two-dimensional frequency distribution of the unsharp image data.

It is preferable for the second image processing apparatus of the present invention to comprise:

conversion means for obtaining color data representing color information of the image from the image data;

multi-resolution conversion means for obtaining multi-resolution image data in a plurality of frequency bands by converting the color data into multiple resolutions;

histogram generating means for generating a histogram of multi-resolution image data in a lowermost frequency band out of the multi-resolution image data in the plurality of frequency bands; and processing means for carrying out the image processing on the image data based on the histogram.

The first image processing method and the second image processing method of the present invention may be provided as a computer-readable recording medium storing a program to cause a computer to execute the methods.

According to the present invention, the sense of contrast of an image represented by image data can be quantified. Therefore, it is possible to quantify not the contrast including various kinds of information of an entire image, such as contrast found by a histogram of the image itself, but a subjective sense perceived by a viewer of the image, such as a shade difference of the entire image, a distribution of a light portion and a dark portion in the image, a lightness distribution in a subject of interest, and information of colors included in the image.

Since not only information perceived by a viewer but also a substantially large amount of information is included in an image represented by image data, lightness information of the overall image is buried in a histogram generated from the image data. Meanwhile, by generating unsharp image data from the image data, an image represented by the unsharp image data does not include a detailed change in pixel values of a subject unlike the original image data, and represents the shade difference of the entire image perceived by a viewer. Therefore, the sense of contrast regarding an image can be quantified by being based on the unsharp image data or a histogram of luminance data and/or color data obtained from the image data.

The position information of a light portion and/or a dark portion in an unsharp image represents a position of a light subject and/or a dark subject in an image. Therefore, based on the position information, a lightness distribution of the image can be represented as the sense of contrast.

In the case where histograms of multi-resolution image data in a plurality of frequency bands are generated by conversion of image data into the multi-resolution image data, a histogram of the image data at a resolution in a lowermost frequency band represents a lightness distribution of the entire image, as does the histogram of unsharp image data. Meanwhile, a histogram of image data at a resolution in a medium or high frequency band represents amplitude of a frequency component corresponding to the frequency band. For example, a shade of a face generated by the nose or hollows of the eyes, or a shade generated by a building or a subject is formed with the medium frequency component while details of trees or flowers, a pattern and texture of a person's clothes, a boundary (an edge) between objects and the like are represented by the high frequency component. Therefore, the more an image has local contrast, the wider a distribution width of the histogram of the image data in the medium or high frequency band becomes. Consequently, the sense of contrast of the entire image data can be quantified by the histogram of the image data in the low frequency band, and the sense of local contrast can also be quantified based on the histogram of the image data in the medium and high frequency bands. In this manner, not only the lightness distribution in an entire image but also a local lightness distribution can be found as the sense of contrast.

Meanwhile, in the case where the luminance data and the color data are obtained from the image data and the luminance histogram and/or the color histogram of the multi-resolution image data are generated by converting the luminance data and/or the color data into the multi-resolution image data, a luminance histogram in a low frequency band represents a lightness distribution in an entire image while a luminance histogram in a medium to high frequency band represents an amplitude of a frequency component corresponding to the frequency band. Therefore, the sense of contrast of an entire image can be quantified based on the luminance histogram in the low frequency band. Furthermore, the sense of local contrast can be represented based on the luminance histogram in the medium and high frequency bands.

The color histogram in the low frequency band represents a chroma distribution of an image as a whole and the color histogram in the medium or high frequency band represents a chroma distribution corresponding to the frequency band. Therefore, the sense of contrast of an entire image based on colors therein can be quantified based on the color histogram in the low frequency band, and the sense of local contrast can be quantified based on the color histogram in the medium and high frequency bands.

Furthermore, by carrying out predetermined image processing on the image data based on the sense of contrast having been found, processed image data reflecting the sense of contrast perceived by a viewer can be obtained.

Moreover, by carrying out image processing for changing the luminance information on the image data based on the color information of an image represented by the image data, processed image data reflecting the sense of contrast perceived by a viewer and induced by the color of the image can be obtained.

BRIEF DESCRIPTION OF THE DRAWINGS

FIG. 9 is a block diagram showing an outline configuration of a second embodiment of the contrast-sense quantification means;

FIG. 16 shows histograms of the data at the resolutions in each frequency band;

DESCRIPTION OF THE PREFERRED EMBODIMENTS

Hereinafter, embodiments of the present invention will be explained with reference to the accompanying drawings.

Figure 1:
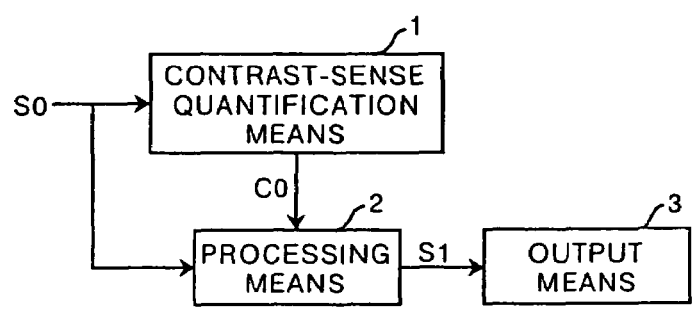
FIG. 1 is a block diagram showing an outline configuration of an image processing apparatus according to an embodiment of the present invention.

FIG. 1 is a block diagram showing an outline configuration of an image processing apparatus according to an embodiment of the present invention. The image processing apparatus according to this embodiment comprises contrast-sense quantification means 1 for quantifying the sense of contrast C0 of an image represented by image data S0, processing means 2 for obtaining processed image data S1 by carrying out image processing on the image data S0 based on the sense of contrast C0 having been quantified by the contrast-sense quantification means 1, and output means 3 such as a printer or a CRT monitor for outputting the processed image data S1 as a visible image.

Figure 2:
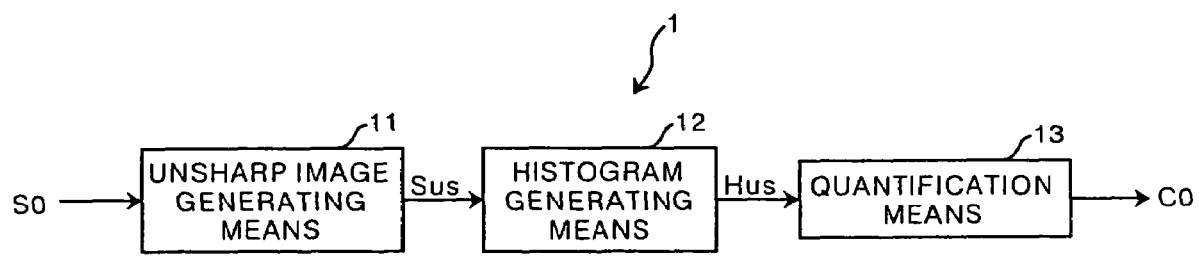
FIG. 2 is a block diagram showing an outline configuration of a first embodiment of contrast-sense quantification means.

FIG. 2 is a block diagram showing a specific outline configuration of the contrast-sense quantification means 1. The contrast-sense quantification means 1 shown in FIG. 2 is explained as a first embodiment. As shown in FIG. 2, the contrast-sense quantification means 1 in the first embodiment comprises unsharp image generating means 11 for generating unsharp image data Sus of the image data S0, histogram generating means 12 for generating a histogram Hus of the unsharp image data Sus, and quantification means 13 for finding the sense of contrast C0 of the image represented by the image data S0 based on the histogram Hus.

Figure 3:
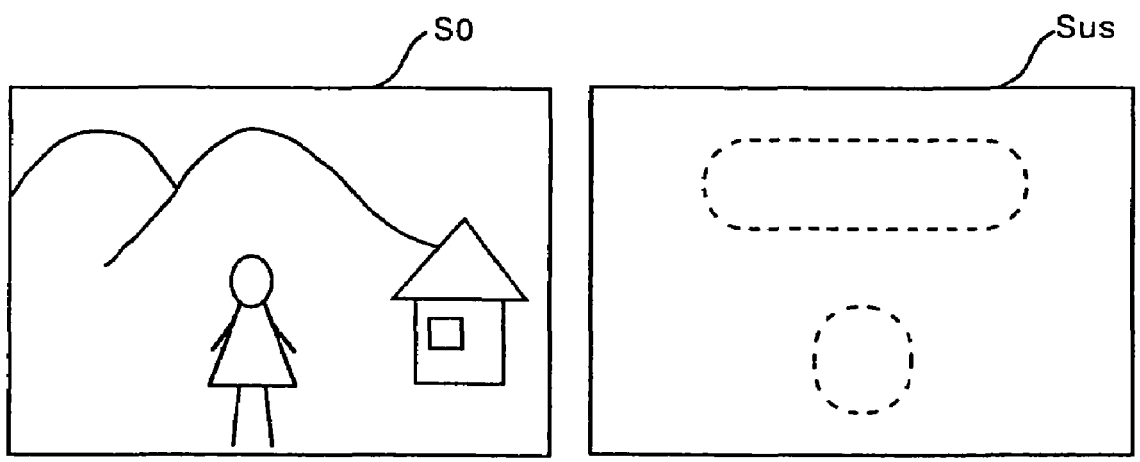
FIG. 3 shows illustrations explaining how unsharp image data are generated.

In the contrast-sense quantification means 1 shown in FIG. 2, the sense of contrast C0 is quantified in the following manner. First, the unsharp image data Sus of the image data S0 are generated by the unsharp image generating means 11. The unsharp image data Sus are generated by carrying out filtering processing using an unsharp mask filter on the image data S0, for example. Examples of images represented by the image data S0 and the unsharp image data Sus are shown in FIG. 3. In FIG. 3, the images represented by the image data S0 and the unsharp image data Sus have the reference codes S0 and Sus respectively. In the unsharp image data Sus, only a frequency band several percent of the Nyquist frequency of the image data S0 exists. More specifically, the unsharp image data Sus represent a frequency component of 0.5~3 cycles/cm in the image represented by the image data S0.

Figure 4:
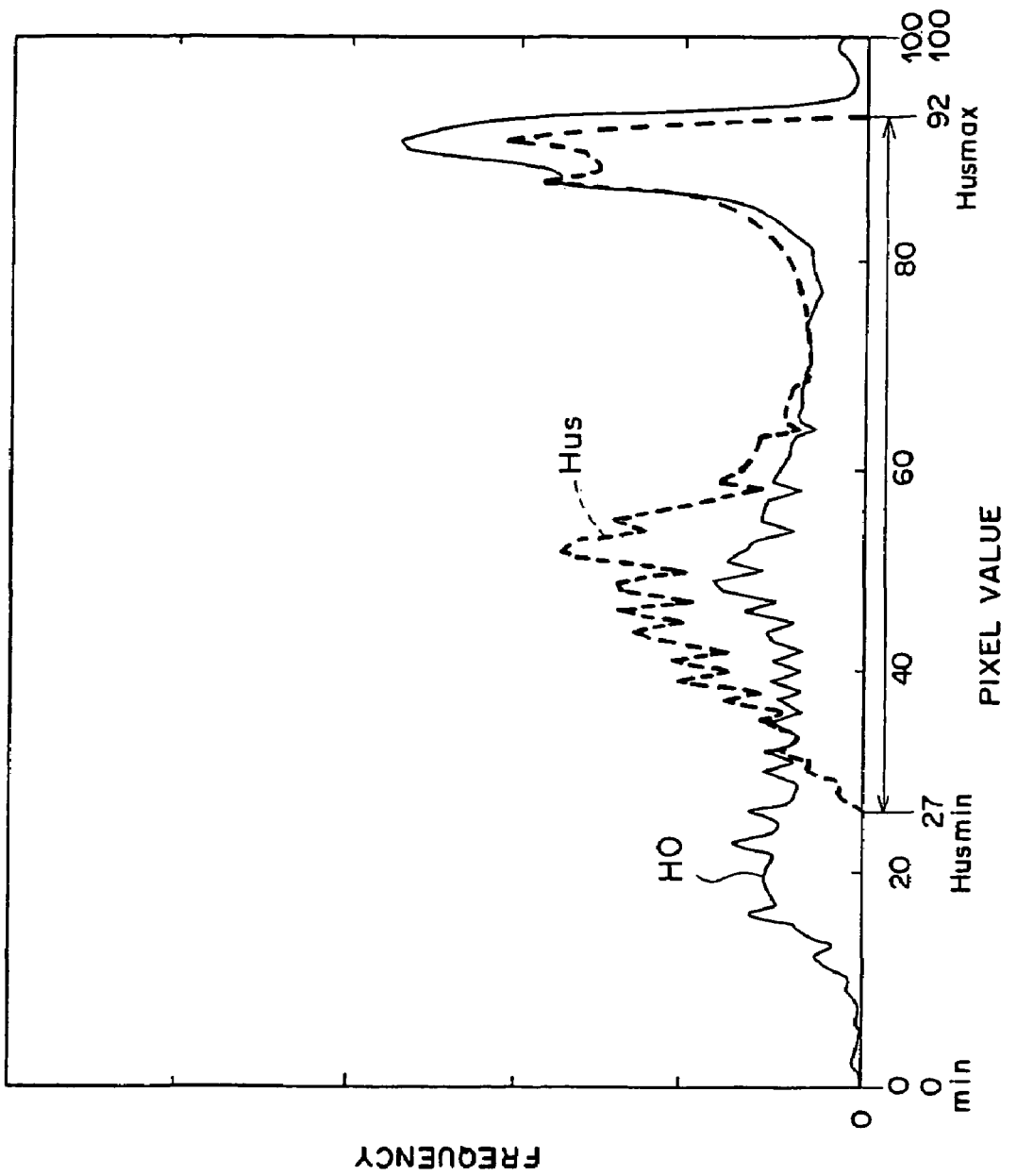
FIG. 4 is an example of a histogram of the unsharp image data.
Figure 5:
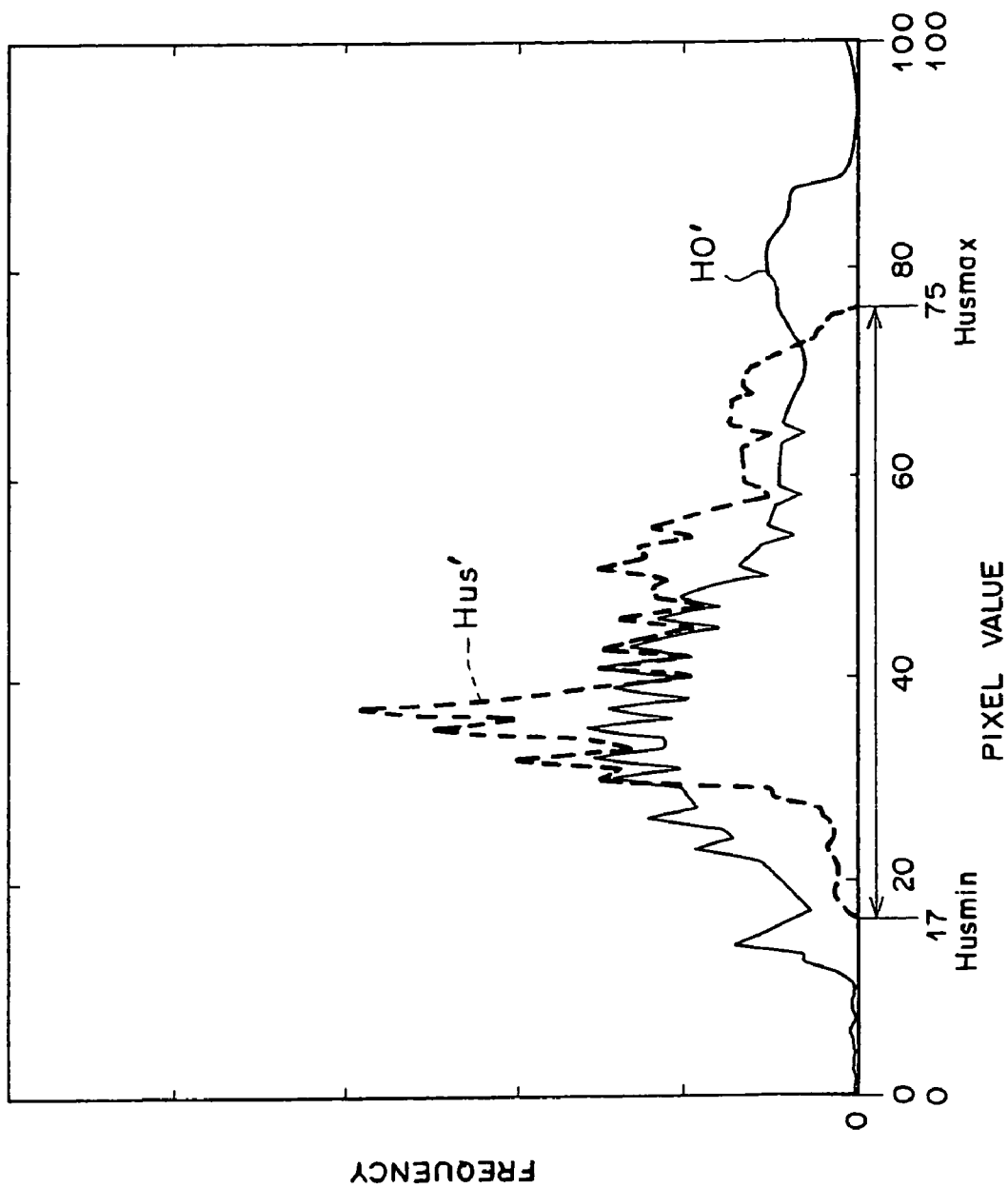
FIG. 5 is another example of the histogram of the unsharp image data.

The histogram generating means 12 generates the histogram Hus of the unsharp image data Sus. FIG. 4 shows the histogram Hus of the unsharp image data Sus together with a histogram H0 of the image data S0. In FIG. 4, pixel values are normalized to 0-100. As shown in FIG. 4, the histogram H0 has a complex shape since the histogram includes not only a lightness distribution in the entire image but also various kinds of information in all subjects and every detail in the image. The shade difference, that is, the contrast found from the histogram H0 ranges from 0-100, which is substantially wide. FIG. 5 shows histograms H0' and Hus' generated from image data S0' different from the image data S0 and unsharp image data Sus' generated from the image data S0'. Comparison of FIG. 4 with FIG. 5 reveals different shapes of the histograms. However, although the shapes of the two histograms H0 and H0' are obviously different, the contrast found from the histogram H0' in FIG. 5 ranges widely from 0 to 100 as the contrast found from the histogram H0 shown in FIG. 4. Therefore, the contrast is not different between the images.

Meanwhile, the histogram Hus has a distribution width 27-92 narrower than that of the histogram H0, and excludes information of the details in the image. This distribution width represents the shade difference of the entire image, that is, the contrast of the image. Although the contrast found by the histogram H0' in FIG. 5 is the same as that of the histogram shown in FIG. 4, a distribution width of the histogram Hus' is 17-75 which is different from the histogram Hus in FIG. 4. Therefore, the two histograms have different distribution widths and distribution positions, and the contrast becomes different between the images. When a viewer observes an image, the viewer judges the contrast by observing the entire image and not the details thereof. Therefore, in the first embodiment, the distribution width of the unsharp image data Sus, that is, a difference w between a maximum Husmax and a minimum Husmin in the histogram Hus is found by the quantification means 13, and the difference w is used as the sense of contrast C0 of the entire image perceived by a viewer.

In the processing means 2, image processing is carried out on the image data S0 based on the sense of contrast C0 quantified by the contrast-sense quantification means 1. A type of contrast of the image represented by the image data S0 is found by comparing the sense of contrast C0, that is, the difference w between the maximum Husmax and the minimum Husmin in the histogram Hus with a threshold value Th1 set in advance. The threshold value Th1 is set to approximately 50 in the case where the pixel values of the entire histogram change in the range 0-100 as shown in FIGS. 4 and 5. However, the threshold value is not always limited to this example. If $C0 \geq Th1$, the image represented by the image data S0 is judged as a high-contrast image, while the image is classified as a low-contrast image if $C0<Th1$. In this case, two threshold values Th1 and Th2 such as $0<Th2<Th1<100$ may be set so that the image is judged to be a high-contrast image when $C0>Th1$ while a standard image and a low-contrast image in the case of $Th2 \leq C0 \leq Th1$ and in the case of $C0<Th2$, respectively. Th1 is set to approximately 80 and Th2 is set to around 40. However, the threshold values are not limited to these numbers.

Figure 6:
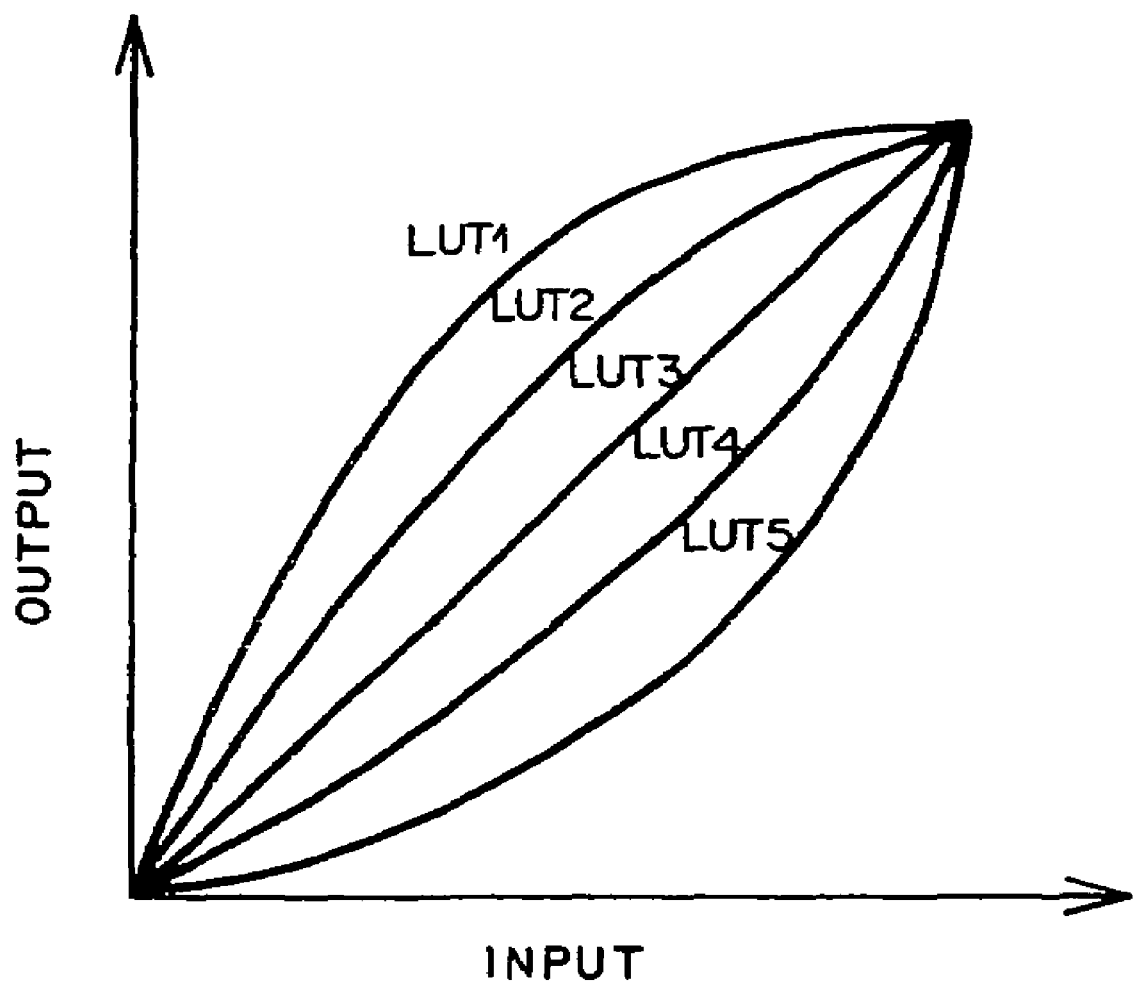
FIG. 6 is a diagram showing tone conversion look-up tables.

When the contrast type of the image is found in the above manner, one of tone conversion look-up tables (LUTs) prepared in accordance with the contrast types is selected and tone conversion processing according to the selected tone conversion LUT is carried out on the image data S0. FIG. 6 is a diagram showing the tone conversion LUTs. In this embodiment, five tone conversion LUTs LUT1~LUT5 are used. In the case where the image has been judged to be a high-contrast image, LUT5 is used. For the image judged to be a low-contrast image or a standard image, the LUT1 or the LUT3 are used, respectively. The image processing for obtaining the processed image data S1 is carried out by conversion of the tones of the image data S0 using the LUT described above. The LUT may be selected from the LUT1 through LUT 5 according to the sense of contrast C0, that is, according to the difference w.

A tone curve represented by a function such as yout=a·yin+b (yout:output, yin:input) may be set by changing the parameters a and b according to the contrast type or according to the sense of contrast C0 (the value of w).

Operation of the first embodiment will be explained next.

Figure 7:
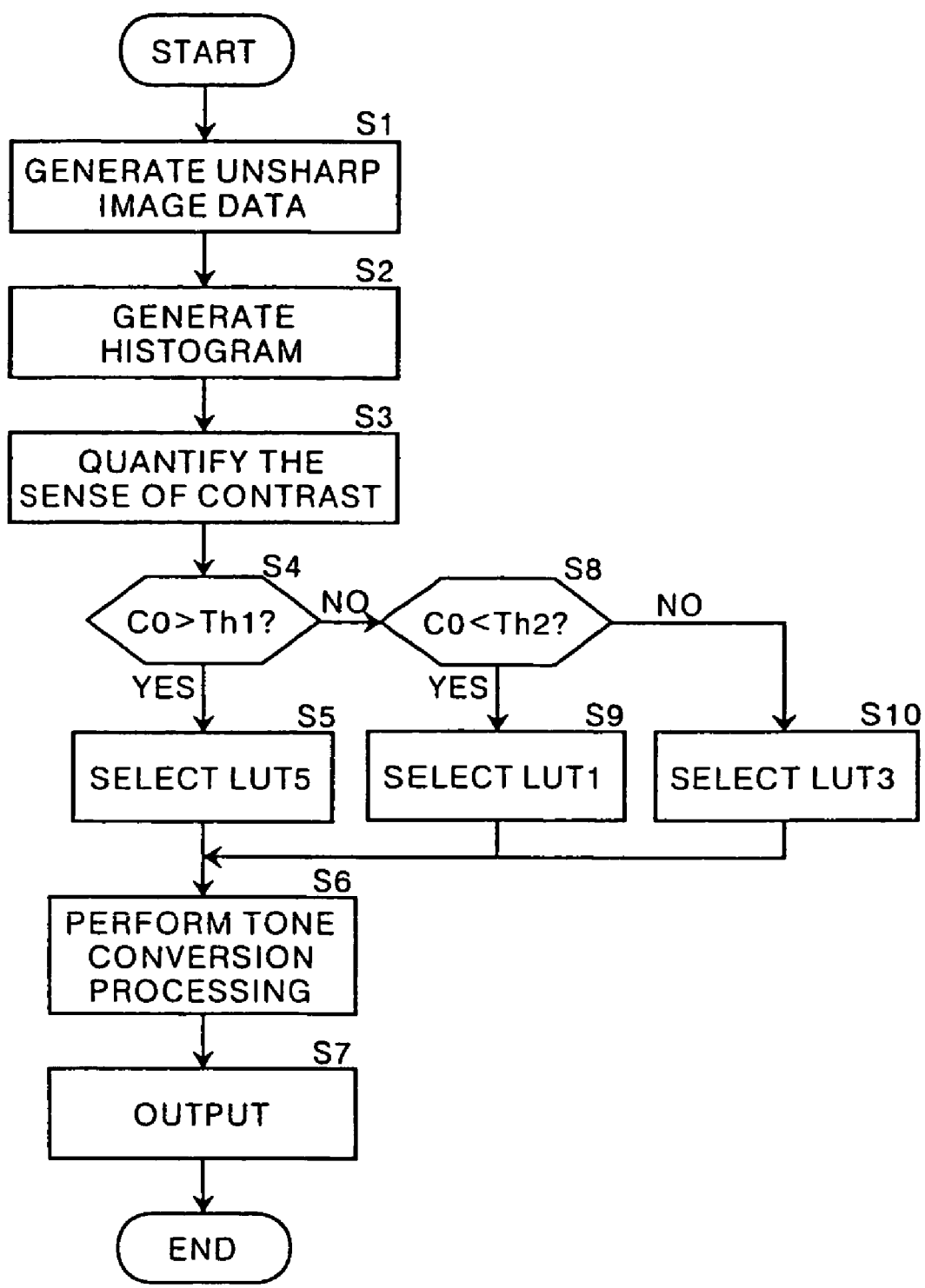
FIG. 7 is a flow chart showing processing carried out in the first embodiment.

FIG. 7 is a flow chart showing the operation of the first embodiment. In the flow chart shown in FIG. 7, the sense of contrast C0 is compared with the two threshold values Th1 and Th2. The unsharp image data Sus of the image data S0 are generated in the unsharp image generating means 11 in the contrast-sense quantification means 1 (Step S1), and the histogram Hus of the unsharp image data Sus is generated in the histogram generating means 12 (Step S2). The quantification means 13 finds the sense of contrast C0 based on the histogram Hus (Step S3). The sense of contrast C0 having been found is then input to the processing means 2, and the processing means judges whether $C0>th1$ is confirmed or not (Step S4). When the judgment result is affirmative, the image is judged to be a high-contrast image and the tone conversion LUT5 is selected for the high-contrast image (Step S5). The tone conversion processing is carried out on the image data S0 (Step S6) to obtain the processed image data S1. The processed image data S1 are then output as a visible image from the output means 3 (Step S7).

When the judgment result at Step S4 is negative, the processing means judges whether $C0<Th2$ is confirmed or not (Step S8). When the judgment result is affirmative, the tone conversion LUT1 is selected (Step S9), since the image is judged to be a low-contrast image. Based on the LUT1, the tone conversion processing is carried out on the image data S0 (Step S6). When the judgment result is negative at Step S8, the image is judged to be the standard image satisfying $Th2 \leq C0 \leq Th1$, and the tone conversion LUT3 is selected (Step S10). Based on the LUT3, the tone conversion processing is carried out on the image data S0 (Step S6).

In the image represented by the image data S0, not only information perceived by the viewer of the image but also a large amount of information is included. Therefore, lightness information of the entire image is buried in the histogram H0 generated from the image data S0. Meanwhile, the image represented by the unsharp image data Sus of the image data S0 represents the shade difference of the entire image perceived by the viewer, since a detailed change in the pixel values of a subject in the image is not included, unlike the image data S0. Therefore, the sense of contrast C0 perceived by the viewer can be quantified by being based on the histogram Hus of the unsharp image data Sus. By carrying out the tone conversion processing on the image data S0 based on the sense of contrast C0, the processed image data S1 representing an image reflecting the sense of contrast C0 perceived by the viewer can be obtained.

Figure 8:
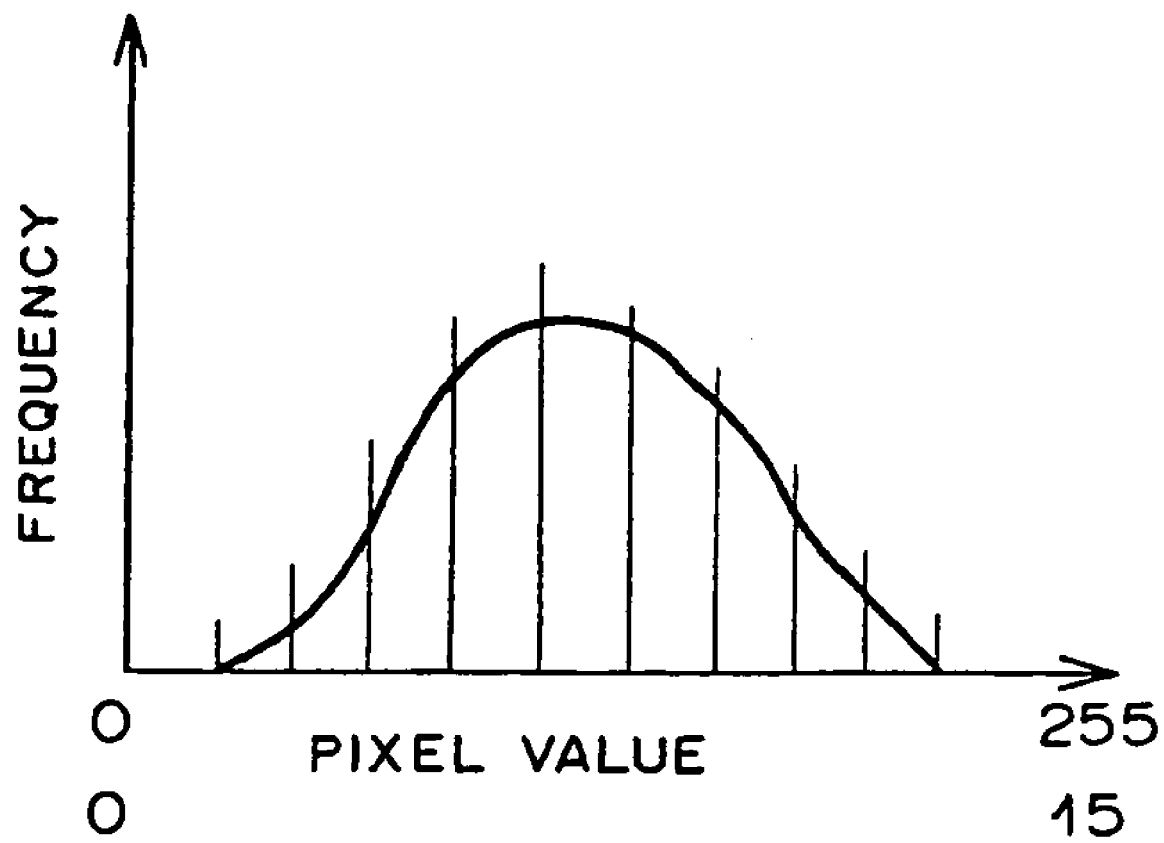
FIG. 8 is a histogram after converting the unsharp image data into hexadecimal numbers.

In the first embodiment, the histogram H0 is generated from the unsharp image data Sus. However, in the case where the unsharp image data Sus have 8-bit data values (0-255), the unsharp image data may be converted into hexadecimal numbers and the histogram may be generated from the unsharp image data Sus having the hexadecimal numbers. At this time, since the unsharp image data Sus, unlike the image data S0, do not include information of the detail of the image, the distribution width of the histogram Hus generated after the conversion into hexadecimal numbers does not change substantially as shown in FIG. 8 when compared with the histogram generated from the 8-bit unsharp image data Sus. Consequently, the sense of contrast C0 obtained therefrom does not change greatly before and after the conversion into hexadecimal numbers. Since the amount of pixel-value data is reduced if the conversion into hexadecimal numbers is carried out, the histogram can be generated easily. Therefore, by generating the histogram after the conversion of the unsharp image data Sus into hexadecimal numbers is carried out, processing can be made faster. In this case, the data values of the unsharp image data Sus have been converted into hexadecimal numbers. However, if the data values are to be made smaller than the 8-bit data, the histogram may be generated after conversion into octal numbers or 32-bit numbers, for example.

In the above embodiment, the sense of contrast C0 has been defined as the difference w between the maximum Husmax and the minimum Husmin in the histogram Hus. However, a pixel value at a position smaller than the maximum Husmax by 10% of (Husmax-Husmin) and a pixel value at a position larger than the minimum Husmin by 10% of (Husmax-Husmin) may be found so that the sense of contrast C0 is defined as a difference between these pixel values.

Furthermore, in the first embodiment described above, the unsharp image data Sus have been generated from the image data S0 to quantify the sense of contrast C0 based on the histogram Hus of the unsharp image data Sus. However, the image data S0 may be converted into luminance data and color data representing luminance information and color information of the image represented by the image data S0 so that the sense of contrast C0 can be quantified based on a histogram of the luminance data and/or the color data. Hereinafter, this method will be explained as a second embodiment.

FIG. 9 is a block diagram showing an outline configuration of the second embodiment of the contrast-sense quantification means 1. As shown in FIG. 9, the contrast-sense quantification means 1 in the second embodiment further comprises conversion means 15 for converting the image data S0 into luminance data L* and color data C*, in addition to the unsharp image generating means 11, the histogram generating means 12, and the quantification means 13 in the first embodiment. Unsharp luminance image data Lus or unsharp color image data Cus which are unsharp image data of the luminance data L* or the color data C* are generated by the unsharp image generating means 11, and the histogram generating means 12 generates a luminance histogram HLus which is a histogram of the unsharp luminance image data Lus and a color histogram HCus which is a histogram of the unsharp color image data Cus.

The conversion means 15 converts the image data S0 into the luminance data L* and the color data C* in the following manner. In the second embodiment, the image data S0 are assumed to comprise RGB color data R0, G0, and B0 following the standard of ITU-R BT.709(REC.709). In the conversion means 15, the color data R0, G0, and B0 comprising the image data S0 are converted into CIE1931 tristimulus values X, Y, and Z based on the following Equations (1) to (3):

$$Pr=R0/255$$

$$Pg=G0/255 \quad (1)$$

$$Pb=B0/255$$

$$R1'=((Pr+0.099)/1.099)^{2.222}$$

$$G1'=((Pg+0.099)/1.099)^{2.222} \text{ (if } Pr,Pg,Pb \geq 0.081) \quad (2)$$

$$B1'=((Pb+0.099)/1.099)^{2.222}$$

$$R1'=Pr/4.5$$

$$G1'=Pg/4.5 \text{ (if } Pr,Pg,Pb<0.081) \quad (2')$$

$$B1'=Pb/4.5$$

$$X \; R0'$$

$$Y=|A|\cdot G0' \quad (3)$$

$$Z \; B0'$$

where the matrix |A| is a matrix for converting the color data R0', G0', and B0' into the tristimulus values X, Y, and Z, and the following numbers can be used, for example:

$$0.4124 \; 0.3576 \; 0.1805$$

$$|A|=0.2126 \; 0.7152 \; 0.0722 \quad (4)$$

$$0.0193 \; 0.1192 \; 1.0571$$

The tristimulus values X, Y, and Z may be found by using a look-up table instead of the matrix |A|.

CIE1976 L*, a*, and b* are found from the tristimulus values X, Y, and Z according to the following Equations (5) to (7):

$$a^*=500\{f(X/Xn)-f(Y/Yn)\} \quad (5)$$

$$b^*=200\{f(Y/Yn)-f(Z/Zn)\} \quad (6)$$

$$L^*=116\,(Y/Yn)^{1/3}-16 \text{ (if } Y/Yn>0.008856) \quad (7)$$

$$L^*=903.25(Y/Yn) \text{ (if } Y/Yn \leq 0.008856)$$

When X/Xn, Y/Yn, Z/Zn>0.008856, $$f(a/an)=(a/an)^{1/3} \; (a=X, Y, Z)$$

When X/Xn, Y/Yn, Z/Zn $\leq$ 0.008856, $$f(a/an)=7.787(a/an)+16/116$$

The values Xn, Yn, and Zn are tristimulus values for a white color and corresponding to CIE-D65 (a light source whose color temperature is 6500 K). The chroma C* is then found according to the following Equation (8):

$$C^*=(a^{*2}+b^{*2})^{1/2} \quad (8)$$

L* and C* are then output as the luminance data L* and the color data C*.

From the luminance data L* or the color data C*, the unsharp luminance image data Lus and the unsharp color image data Cus which are the unsharp image data of the luminance data L* or the color data C* are generated by the unsharp image generating means 11, as in the first embodiment. For the color data C*, a degree of unsharpness can be lower than that of the luminance data L*, taking not only an overall color change but also an influence of the medium frequency component such as fine glasses and flowers into consideration. More specifically, the unsharp color image data Cus preferably represents frequency components such as 0.5~10 cycles/cm in the image represented by the image data S0.

As in the first embodiment, the histogram generating means 12 generates the luminance histogram HLus or the color histogram HCus from the unsharp luminance image data Lus or the unsharp color image data Cus, respectively.

The quantification means 13 finds the distribution width of the luminance histogram HLus or the color histogram HCus to be output as the sense of contrast Co.

Based on the sense of contrast having been found in the above manner, the processing means 2 carries out image processing on the image data S0. More specifically, the type of contrast of the image represented by the image data S0 is found based on the sense of contrast C0, as in the first embodiment. The tone conversion LUT according to the type is selected and the tone conversion processing is carried out on the image data S0 by using the tone conversion LUT having been selected.

In the case where the sense of contrast C0 is found from the color data C* in the second embodiment, chroma conversion processing for causing the chroma of the image represented by the image data S0 to increase may be carried out if the type of contrast found from the sense of contrast C0 is low. More specifically, the chroma is improved by multiplying the chroma C* found from Equation (8) with an enhancement coefficient αc. As a value of the coefficient αc, approximately 1.2 is preferable. However, the value is not limited to this example. Furthermore, the tone conversion processing and the chroma conversion processing may be carried out at the same time.

In the case where the chroma is improved, not only multiplication with the uniform coefficient αc for the entire image represented by the image data S0 but also multiplication with αc as a function of chroma may be carried out so that an area of low chroma in the image has more improved chroma. The coefficient αc may be changed in accordance with a hue angle H ($=\tan^{-1}(b^*/a^*)$).

Figure 10A:
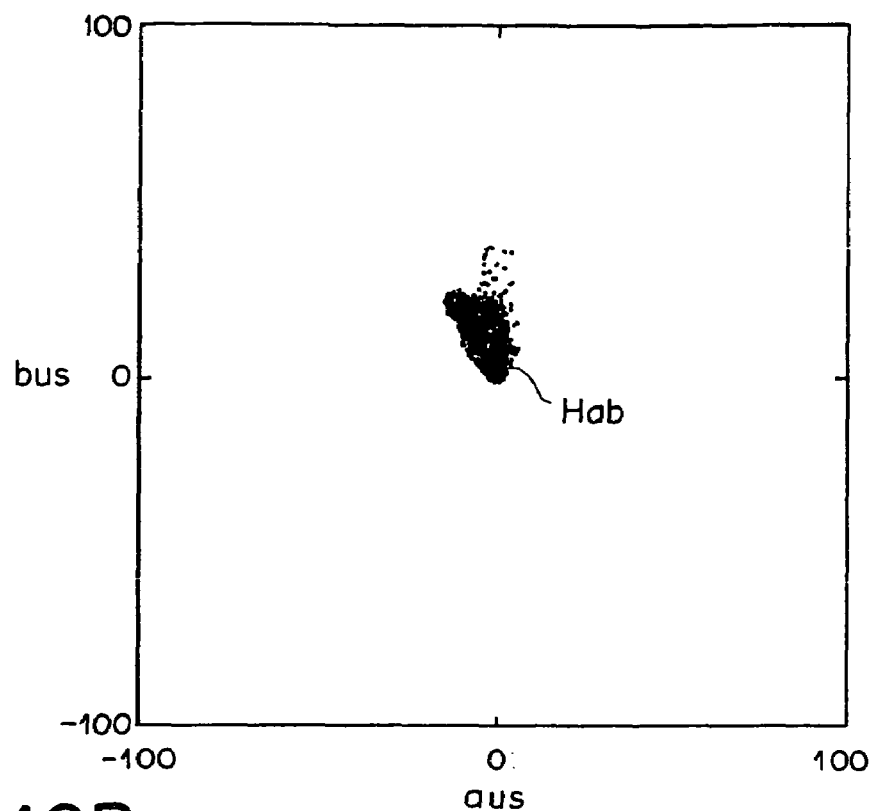
FIGS. 10A and 10B show two-dimensional histograms.
Figure 10B:
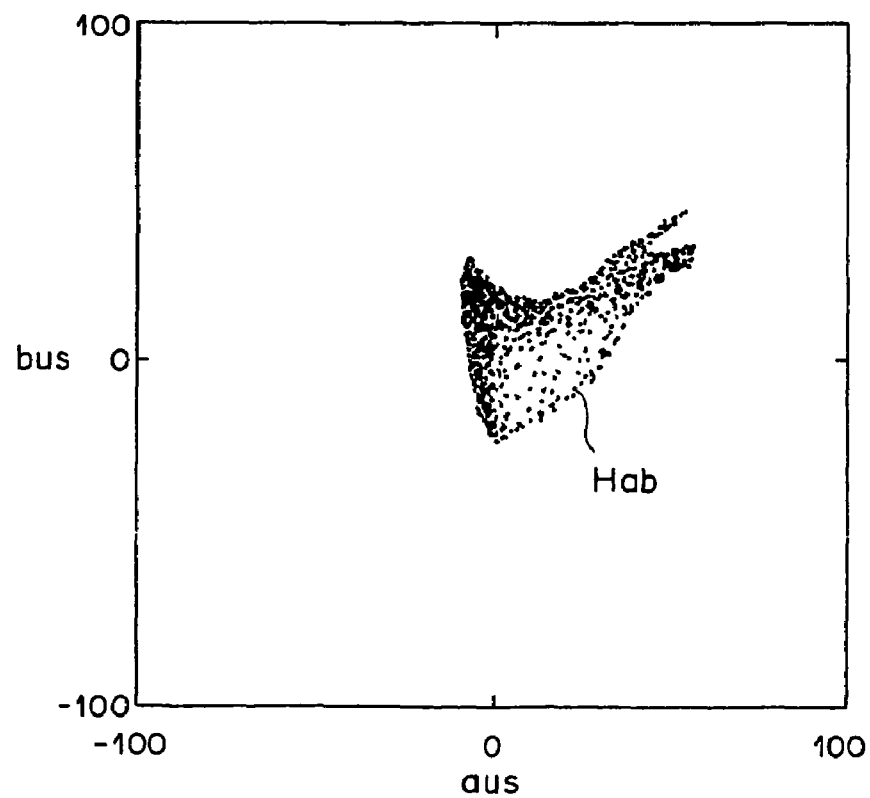

In the second embodiment, the conversion means 15 finds the chroma C* according to Equation (8) and uses C* as the color data. However, a* and b* found from Equations (5) and (7) may be used as the color data. In this case, the unsharp image generating means 11 finds unsharp color image data aus and bus of a* and b*, and the histogram generating means 12 generates a two-dimensional histogram Hab from the unsharp color image data aus and bus. FIG. 10 shows an example of the two-dimensional histogram Hab. In FIG. 10, a distance from the origin represents the chroma. The sharper a color is, the farther the color is located from the origin. Therefore, when the image represented by the image data S0 has a multitude of vivid colors, a distribution of the two-dimensional histogram Hab is widened. For example, in FIGS. 10(*a*) and 10(*b*), the image from which the two-dimensional histogram Hab shown in FIG. 10(*b*) is generated has sharper colors, since the distribution is wider in FIG. 10(*b*).

Therefore, by finding a distribution area Ac of the two-dimensional histogram Hab, the area can be used as the sense of contrast C0. Based on the sense of contrast C0, the type of contrast of the image represented by the image data S0 is found as in the first embodiment, and image processing such as the tone conversion processing and the chroma conversion processing can be carried out on the image data S0.

In the second embodiment, the sense of contrast C0 may be defined as a ratio $R=P/P_{all}$ where P is the number of pixels having the color data C* equal to or larger than a predetermined threshold value and $P_{all}$ is the number of all the pixels in the image represented by the image data S0. More specifically, in the aus-bus plane shown in FIG. 10, a circular area centering on the origin and having a predetermined radius (a radius corresponding to the threshold value) is set and pixels not included in the circle are counted as the pixels P and the ratio R which is the ratio of P to the number of all pixels $P_{all}$ is found as the sense of contrast C0.

Figure 11:
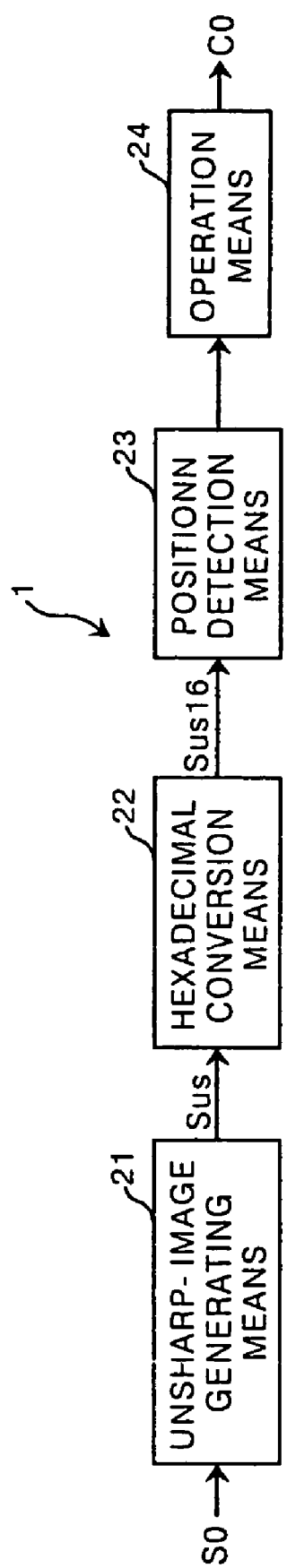
FIG. 11 is a block diagram showing an outline configuration of a third embodiment of the contrast-sense quantification means.
Figure 12:
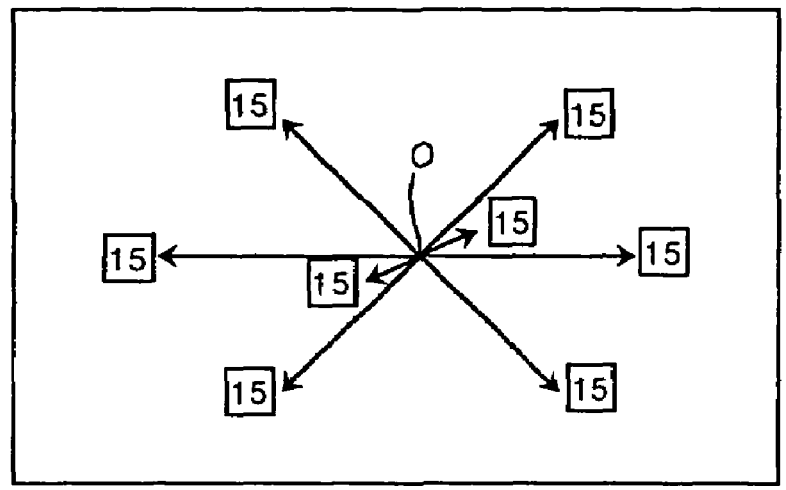
FIG. 12 is a diagram explaining processing carried out in the third embodiment.

In the first embodiment described above, the histogram Hus of the unsharp image data Sus of the image data S0 have been generated, and the sense of contrast C0 has been quantified based on the histogram Hus. However, the sense of contrast C0 may be found as a distribution of a light portion and/or a dark portion in an image. Hereinafter, this method will be explained as a third embodiment. FIG. 11 is a block diagram showing an outline configuration of the third embodiment of the contrast-sense quantification means 1. As shown in FIG. 11, the contrast-sense quantification means 1 in the third embodiment comprises unsharp image generating means 21 for generating the unsharp image data Sus of the image data S0, hexadecimal conversion means 22 for obtaining hexadecimal unsharp image data Sus16 by converting the unsharp image data Sus into hexadecimal numbers 0-15, position detection means 23 for detecting a position of a pixel having the maximum number 15 in an image represented by the hexadecimal unsharp image data Sus16, and operation means 24 for finding a distance between the pixel position detected by the position detection means 23 and the center O of the image and for calculating a standard deviation σ of the distance defined as the sense of contrast C0. The sense of contrast C0 calculated in the above manner quantifies a distribution of the light portion perceived by a viewer of the image.

When the standard deviation σ calculated by the operation means 24 is comparatively small, the image is judged to be an image having the light portion concentrated around the center thereof (for example, a flash image obtained by photographing using a flash), and image processing adequate therefor is carried out by the processing means 2. In the third embodiment, the processing means 2 judges whether or not the sense of contrast C0, that is, the standard deviation σ found by the contrast-sense quantification means 1 is smaller than a predetermined threshold value Th5. When σ<Th5, the image is judged to be a flash image having the light portion concentrated around the center thereof, and image processing adequate therefor is carried out on the image data S0. When σ≧Th5, the image is judged to be a standard image and image processing adequate therefor is carried out on the image data S0.

In a flash image, the contrast increases, since strong light is irradiated on a subject thereof. Therefore, the subject appears whiter reflecting the flash. For this reason, the processing means 2 extracts the light portion from the image represented by the image data S0 when σ<Th5, and carries out the tone conversion processing using the LUT5 shown in FIG. 6 on the image data S0 in the portion so as to suppress the contrast. In this manner, the contrast in the light portion is suppressed and it is possible to obtain processed image data S1 representing an image having no strong reflection.

Figure 13:
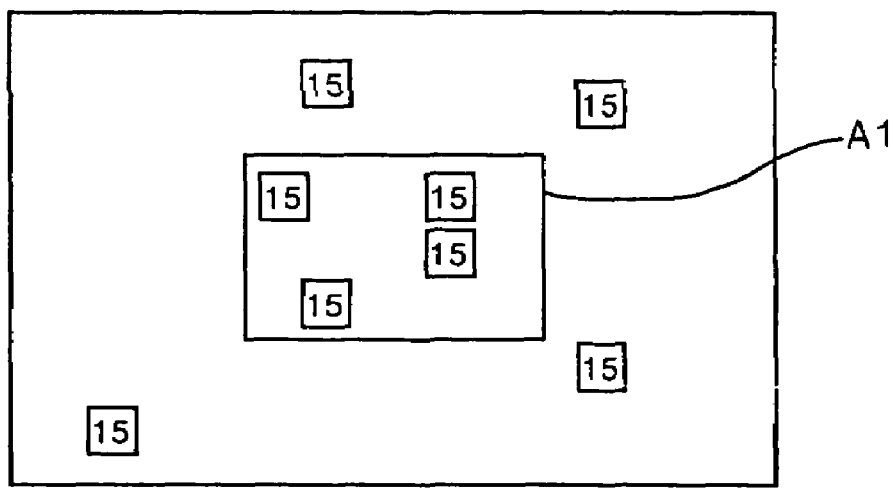
FIG. 13 is a diagram explaining processing carried out in a modification of the third embodiment.

In the third embodiment described above, the sense of contrast C0 has been defined as the standard deviation σ of the distance between the pixel position found by the position detection means 23 and the image center O. However, as shown in FIG. 13, an area A1 having a predetermined area around the center O is set and the number of pixels having the hexadecimal number 15 in the area A1 may be counted as the sense of contrast C0. In this case, the processing means 2 judges whether or not the sense of contrast C0, that is, the number of the pixels having the hexadecimal number 15 in the area A1, is larger than a predetermined threshold value Th6. When C0>Th6, the image is judged to be an image having a light portion concentrated around the center thereof, and the processing means 2 carries out the tone conversion processing for suppressing the contrast in the area A1. When C0≦Th6, the image is judged to be a standard image and the processing means 2 carries out the image processing adequate therefor. In this manner, the processed image data S1 representing the image having no strong reflection and suppressed contrast in the light portion can be obtained.

In the first embodiment, the unsharp image data Sus of the image data S0 have been generated and the histogram of the unsharp image data Sus has been found to be used for quantifying the sense of contrast C0. However, the image data S0 may be converted into a multi-resolution space in a plurality of frequency bands so that histograms of the data at the resolutions in the frequency bands are generated to be used for quantification of the sense of contrast C0. Hereinafter, this method will be explained as a fourth embodiment.

Figure 14:
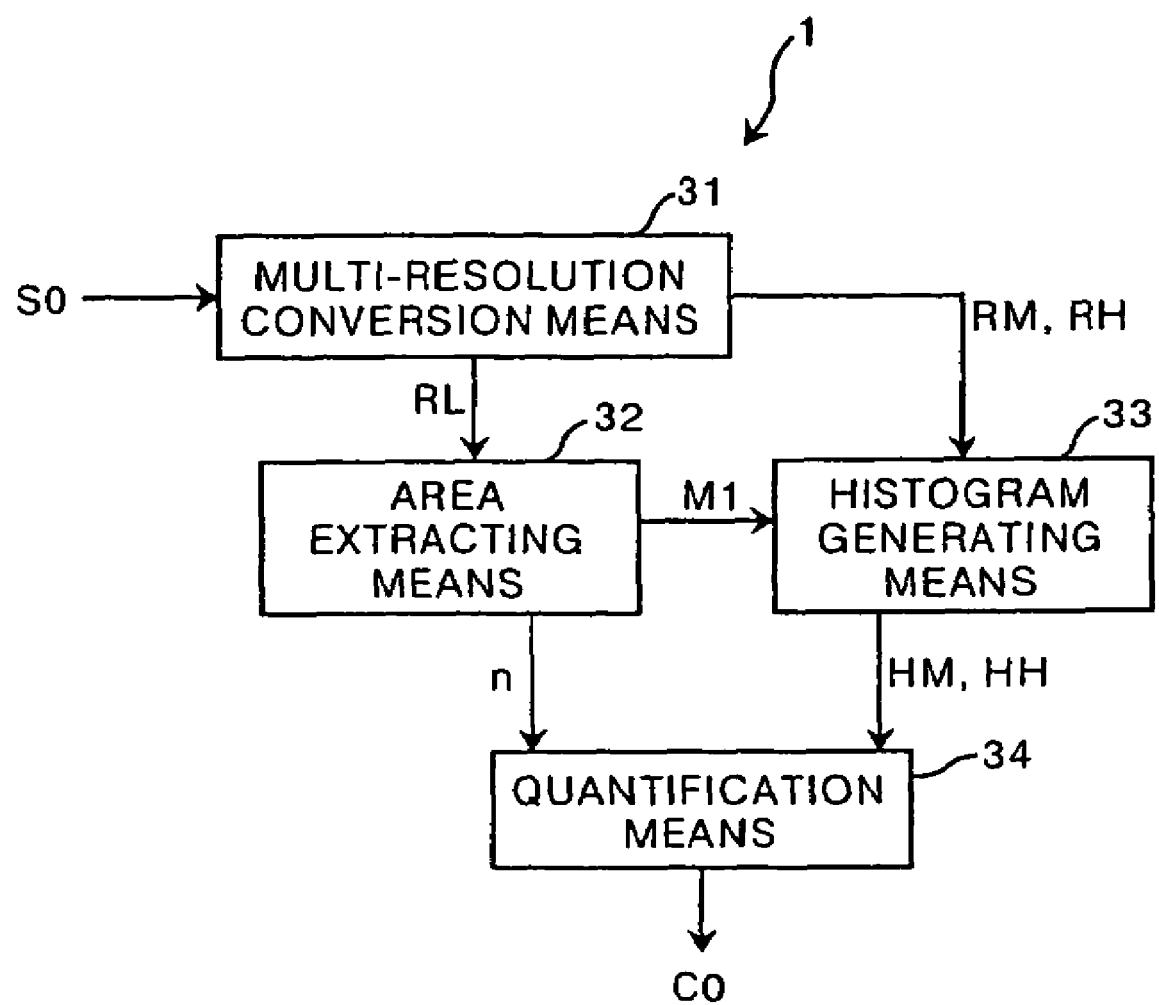
FIG. 14 is a block diagram showing an outline configuration of a fourth embodiment of the contrast-sense quantification means.

FIG. 14 is a block diagram showing an outline configuration of the contrast-sense quantification means 1 in the fourth embodiment. As shown in FIG. 14, the contrast-sense quantification means 1 in the fourth embodiment comprises multi-resolution conversion means 31 for obtaining multi-resolution image data (hereinafter called resolution data) RL, RM, and RH in a low frequency band, a medium frequency band, and a high frequency band respectively by converting the image data S0 into a multi-resolution space by using a method such as wavelet transform and Laplacian pyramid, area extracting means 32 for extracting, as a light portion M1, an area in which pixel values are equal to or larger than a predetermined threshold value Th7 from the resolution data RL in the low frequency band, histogram generating means 33 for generating histograms HM and HH of an area corresponding to the light portion M1 regarding the resolution data RM and RH in the medium frequency band and in the high frequency band, and quantification means 34 for quantifying the sense of contrast C0 of the image represented by the image data S0.

Figure 15A:
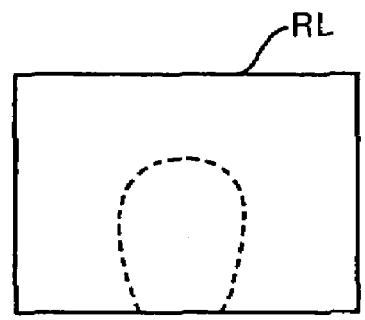
FIGS. 15A through 15C are illustrations of images represented by data at resolutions in each frequency band.
Figure 15B:
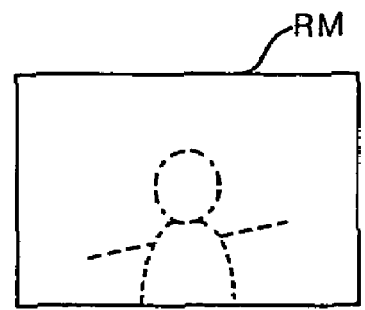
Figure 15C:
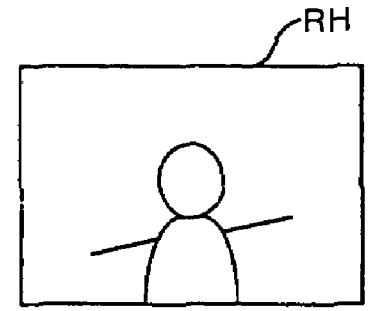

In the contrast-sense quantification means 1 in the fourth embodiment, the sense of contrast C0 is found in the following manner. First, the image data S0 are converted into the multi-resolution space by the multi-resolution conversion means 31 and the resolution data RL, RM and RH in the low, medium, and high frequency bands are generated. The resolution data RL in the low frequency band include information of lightness while the resolution data RM and RH in the medium and high frequency bands represent frequency components only. In FIG. 15, FIGS. 15(*a*), 15(*b*), and 15(*c*) show images represented by the resolution data in the low frequency band, in the medium frequency band, and in the high frequency band, respectively.

The resolution data RL in the low frequency band are input to the area extracting means 32 and the area in which the pixel values are equal to or larger than the threshold value Th7 is extracted as the light portion M1 to be input to the histogram generating means 33. Meanwhile, the number n of the pixels in the light portion M1 is input to the quantification means 34. The histogram generating means 33 generates the histograms HM and HH corresponding to the light portion M1 regarding the resolution data RM and RH in the medium and high frequency bands.

A distribution width BL of a histogram HL of the resolution data RL in the low frequency band shows a distribution of pixel values as in FIG. 16(*a*), and represents overall lightness of the image, as do the histograms shown in FIGS. 4 and 5 do. Distribution widths BM and BH of the histograms HM and HH of the resolution data RM and RH in the medium and high frequency bands show amplitudes of frequencies centering on 0 as shown in FIGS. 16(*b*) and (*c*).

For example, a shade of a face generated by the nose or hollows of the eyes, and a shade generated by a building or a subject is formed with frequency components in the medium frequency band higher than the low frequency band. Therefore, the more an image has local contrast of a subject such as a face, the larger the local shade becomes. As a result, the amplitude of the resolution data RM in the medium frequency band becomes large. Meanwhile, details of trees or flowers, a pattern and texture of a person's clothes, a boundary (an edge) between objects and the like are formed with the high frequency component. Therefore, the larger the contrast of a local area corresponding to the detailed structure becomes, the clearer the detailed structure appears. As a result, the amplitude of the resolution data RH in the high frequency band becomes larger.

The quantification means 34 quantifies the sense of contrast C0 based on the histograms HM and HH. First, the distribution width BM in the histogram HM of the resolution data RM in the medium frequency band is compared with a predetermined threshold value Th8. If the distribution width BM of the histogram HM is larger than the threshold value Th8 (BM>Th8), the image is judged to be a standard image having a comparatively large amount of information of the medium frequency band. If the width BM is equal to or smaller than the threshold value Th8 (BM≦Th8), the image is judged to be a low-contrast image not including a substantially large amount of information of the medium frequency band. In the case where the image is judged to be the standard image, the distribution width BH in the histogram HH of the resolution data RH in the high frequency band may be compared with a predetermined threshold value Th9 so that the image can be judged to be a high-contrast image including a comparatively large amount of high frequency information if the distribution width BH is larger than the threshold value Th9 (BH>Th9). Otherwise (BH≦Th9) the image is judged to be the standard image not including a substantial amount of the high frequency information. Meanwhile, the number n of the pixels in the light portion M1 extracted by the area extracting means 32 may be compared with a predetermined threshold value Th10 so that the image is judged to be the low-contrast image if the number n is smaller than the threshold value Th10 (n<Th10). In this case, if the number n is equal to or larger than the threshold value Th10, the type of contrast is judged by using the resolution data RM and RH in the medium and high frequency bands, as has been described above.

After the type of contrast has been found in the above manner, the type of contrast is output as the sense of contrast C0. In this case, the sense of contrast C0 is a signal having a number corresponding to the type of contrast, such as 1 for. the low-contrast image, 2 for the high-contrast image, and 3 for the standard image, for example.

The processing means 2 carries out on the image data S0 the image processing for converting the tone by selecting the tone conversion LUT as in the first embodiment, based on the sense of contrast C0 quantified by the contrast-sense quantification means 1. In this manner, the processed image data S1 are obtained.

In the fourth embodiment described above, the luminance data L* or the color data C* of the image data S0 may be found as in the second embodiment. Resolution data of the luminance data L* or the color data C* are then obtained by converting the luminance data L* or the color data C* into the multi-resolution space. The sense of contrast C0 is then quantified based on the resolution data. Hereinafter, this method will be explained as a fifth embodiment.

Figure 17:
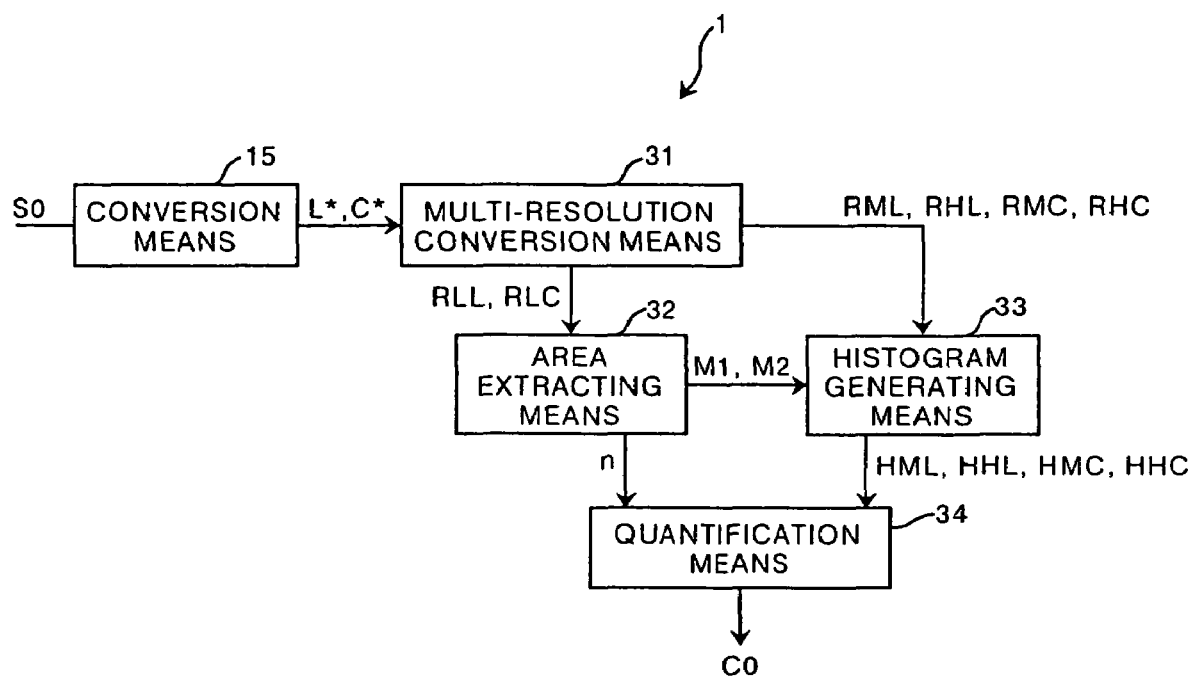
FIG. 17 is a block diagram showing an outline configuration of a fifth embodiment of the contrast-sense quantification means.

FIG. 17 is a block diagram showing an outline configuration of the contrast-sense quantification means 1 in the fifth embodiment. As shown in FIG. 17, the contrast-sense quantification means 1 in the fifth embodiment comprises the conversion means 15 in the second embodiment, in addition to the multi-resolution conversion means 31, the area extracting means 32, the histogram generating means 33 and the quantification means 34 in the fourth embodiment. The multi-resolution conversion means 31 converts the luminance data L* or the color data C* into the multi-resolution space and obtains luminance resolution data RLL, RML, and RHL or color resolution data RLC, RMC, and RHC in the low, medium, and high frequency bands.

In the case where only the luminance resolution data RLL, RML and RHL are obtained, the area extracting means 32 extracts the light portion M1 from the luminance resolution data RLL in the low frequency band as in the fourth embodiment, and the histogram generating means 33 generates luminance histograms HML and HHL corresponding to the light portion M1 regarding the resolution data RML and RHL in the medium and high frequency bands, respectively. The quantification means 34 then quantifies the sense of contrast C0 based on the luminance histograms HML and HHL.

In the case where only the color resolution data RLC, RMC and RHC are obtained, the area extracting means 32 extracts a high-chroma area M2 having data values equal to or larger than a predetermined threshold value from an image represented by the color resolution data RLC in the low frequency band.

The color resolution data RMC in the medium frequency band represents a shade of a face generated by the nose or hollows of the eyes and a shade generated by a building or a subject, as the resolution data RM of the image data S0 in the medium frequency band. The color resolution data RHC in the high frequency band also represents detailed structures such as details of trees or flowers, a pattern and texture of a person's clothes, and a boundary (an edge) between objects, as the resolution data RH of the image data S0 in the high frequency band.

Therefore, the histogram generating means 33 generates color histograms HMC and HHC of the color resolution data RMC and RHC in the medium and high frequency bands regarding the high-chroma area M2 extracted by the area extracting means 32. As in the fourth embodiment above, the quantification means 34 then judges the type of contrast by comparing the amplitudes of the color histograms HMC and HHC with a predetermined threshold value, and the judgment result can be obtained as the sense of contrast C0.

In the case where the sense of contrast C0 is found from the color data C*, the chroma conversion processing for enhancing the chroma of the image represented by the image data S0 may be carried out based on the sense of contrast C0 if the type of contrast is a low-contrast image. More specifically, the chroma is improved by multiplication of the chroma C* found by using Equation (8) with the enhancement coefficient αc. As the value of αc, approximately 1.2 is preferable, but it is not limited to this value.

In the fifth embodiment described above, if both the luminance resolution data RLL, RML and RHL and the color resolution data RLC, RMC, and RHC are obtained, the light portion M1 is extracted based on the luminance data RLL in the low frequency band and the color histograms HMC and HHC corresponding to the light portion M1 are generated for the color resolution data RMC and RHC in the medium and high frequency bands. Based on the color histograms HMC and HHC, the sense of contrast C0 can be quantified. Alternatively, the high-chroma area M2 may be extracted based on the color resolution data RLC in the low frequency band so that the luminance histograms HML and HHL corresponding to the high-chroma area M2 are generated for the luminance resolution data RML and RHL in the medium and high frequency bands to quantify the sense of contrast C0.

In the first and third embodiments described above, the sense of contrast C0 has been found as the distribution width of the histograms of the image data S0, the luminance data L* and the color data C*, while the standard deviation of the image data S0 has been found as the sense of contrast C0 in the second embodiment. However, regarding the image data S0, various kinds of information may be found as characteristic quantities making it possible to find the distribution widths and standard deviations of the histograms of the image data S0, the luminance data L* and the color data C* as well as the sense of contrast C0 of the image data S0. The sense of contrast C0 is then quantified by weighting and adding the characteristic quantities according to Equation (9) below:

$$C0 = \sum_n an \cdot vn \qquad (9)$$

where vn is the characteristic quantity, an is a weight, and n is the number of the characteristic quantities. The weight an may be found empirically. In other words, the sense of contrast C0 is found while changing the weight, and visual evaluation is carried out on a plurality of images generated through different image processing in accordance with the sense of contrast C0. By selecting an image agreeing with the sense of contrast perceived visually, the weight an used at the time of generating the image is used for Equation (9).

In the first to third embodiments described above, the sense of contrast C0 has been quantified. However, the type of contrast of the image may be found as the sense of contrast, as in the fourth and fifth embodiments.

In the first to third embodiments, the type of contrast may be judged in accordance with a result of weighted addition of the characteristic quantities vn as shown in Equation (10) below, and the judgment result may be used as the sense of contrast C0:

$$Ph = \sum_n hn \cdot vn \text{ (for high-contrast image)} \qquad (10)$$

$$Ps = \sum_n sn \cdot vn \text{ (for standard-contrast image)}$$

$$Pl = \sum_n ln \cdot vn \text{ (for low-contrast image)}$$

Here, hn, sn, and ln are weights for calculating Ph, Ps, and Pl as indices representing probabilities of an image being a low-contrast image, a standard image and a high-contrast image, respectively. For example, if Ph, Ps, and Pl are respectively calculated to be 10%, 30%, and 70% for an image and 80%, 40%, and 5% for another image, the former is judged to be a low-contrast image and the latter is judged to be a high-contrast image. In this case, the sense of contrast C0 is a signal having a number in accordance with the type of contrast, such as 1 for the low-contrast image, 2 for the high-contrast image and 3 for the standard image. Based on the type of contrast represented by the sense of contrast C0, the tone conversion LUT is selected and the tone conversion processing is carried out on the image data S0.

In the fourth embodiment above, the sense of contrast C0 has been quantified based on the number n of the pixels in the light portion M1 obtained from the resolution data RL in the low frequency band and from the distribution width BM and BH of the histograms HM and HH of the resolution data RM and RH in the medium and high frequency bands. However, the number of pixels in the light portion, the distribution width of the histogram, or the standard deviation used in the third embodiment may be found as the characteristic quantities for the resolution data RL, RM, and RH in the low, medium, and high frequency bands so that the sense of contrast C0 in each frequency band can be quantified by weighted addition of the characteristic quantities according to Equation (9). Furthermore, as shown by Equation (11) below, by weighted addition of the sense of contrast C0 found for each of the frequency bands, the sense of contrast may be quantified. The characteristic quantities may include the number n of the pixels in the light portion M1 obtained from the luminance resolution data RLL in the low frequency band, the distribution widths of the luminance histograms RML and RHL in the medium and high frequency bands, and/or the distribution widths of the color histograms HMC and HHC of the color resolution data RMC and RHC in the medium and high frequency bands in the high-chroma area M2 obtained from the color resolution data RLC in the low frequency band used in the fifth embodiment:

$$C0 = L \cdot \sum_i \alpha i \cdot li + M \cdot \sum_j \beta j \cdot mj + H \cdot \sum_k \gamma k \cdot hk \qquad (11)$$

where li, mj, hk are the characteristic quantities in each of the frequency bands, αi, βj, and γk are weights corresponding to an in Equation (9), L, M, and H are weights in each of the frequency bands, and i, j, and k are the numbers of the characteristic quantities in each of the frequency bands. The weights $\alpha i$, $\beta j$, and $\gamma k$ and L, M, and K are found empirically as the weight an in Equation (9) above. In Equation (11), if L=1, M=0, and H=0, Equation (11) is practically equivalent to Equation (9).

In this case, the image may be classified such as the low-contrast image, the standard image, and the high-contrast image, according to the value of the sense of contrast C0 found by using Equation (9) or (11), and the classification result may be used as the sense of contrast C0. In this case, the sense of contrast C0 is a value representing the low-contrast image, the standard image or the high-contrast image.

In the fourth and fifth embodiments described above, the probability of the type of contrast may be found as in Equation (10) so that the type of contrast of an image can be found based on the probability. The judgment result is then used as the sense of contrast C0.

Figure 18:
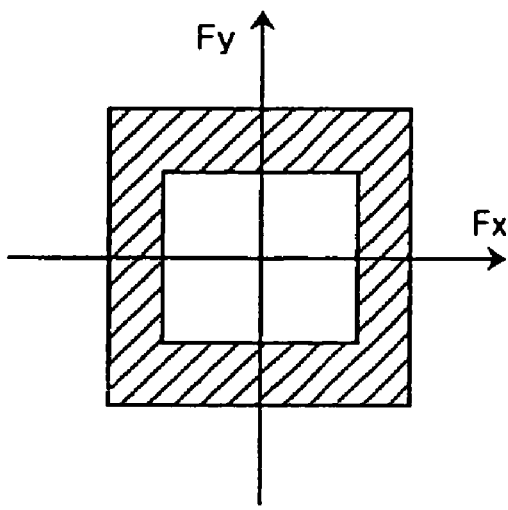
FIG. 18 explains frequency enhancing processing.

In the above embodiments, the processing means 2 carries out the tone conversion processing by changing the tone conversion LUT according to the sense of contrast C0 and/or performing chroma conversion processing on the image data S0. However, the image processing is not limited to the processing above. For example, the sense of contrast C0 is compared with a predetermined threshold value Th11 and if C0<Th11, frequency processing for enhancing the sense of contrast, such as enhancement of a frequency component shown by a hatched portion in FIG. 18 by using Equation (12) below may be carried out on the image data S0. In FIG. 18, an Fx axis and an Fy axis represent frequencies in a Fourier Plane and the hatched portion corresponds to a high frequency component in the image data S0:

$$F'(x, y)=F(x,y)+\beta\{F(x,y)-F(x,y)\cdot d(C0)\} \quad (12)$$

where F(x,y) represents image data S0, F'(x,y) is the processed image data S1, d(C0) is a function for determining a degree of unsharpness, and $\beta$ is an enhancement coefficient.

Figure 19:
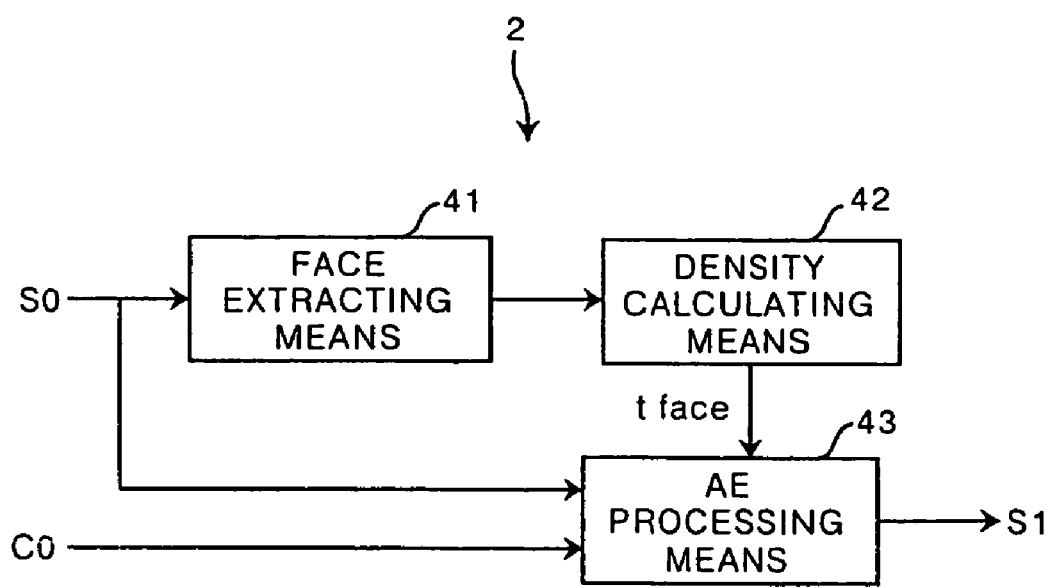
FIG. 19 is a block diagram showing an outline configuration of processing means carrying out AE processing.

Furthermore, in the case where the image data S0 represents an image including a human face, a face area corresponding to the face may be extracted from the image data S0 so that AE processing (automatic exposure control processing) for changing the brightness of the face area is carried out according to the density of the face area and the sense of contrast C0 having been quantified. In this manner, the processed image data S1 may be obtained. Hereinafter, processing means for carrying out the AE processing will be explained. FIG. 19 is a block diagram showing an outline configuration of the processing means 2 for carrying out the AE processing. As shown in FIG. 19, the processing means 2 comprises face extracting means 41 for extracting an area of a human face from the image represented by the image data S0, density calculating means 42 for finding a density tface of the face area extracted by the face extracting means 41, and AE processing means 43 for obtaining the processed image data S1 by carrying out the AE processing on the image data S0 based on the sense of contrast C0 and the density tface of the face area.

As a method of extracting the face by using the face extracting means 41, the image may be divided based on a distribution of hue and chroma of the image represented by the image data S0 so that a face candidate area is extracted, and the face area is extracted from a shape of an area neighboring the face candidate area, as described in Japanese Unexamined Patent Publication No. 6(1994)-67320, for example. Alternatively, an ellipse circumscribing a simply-extracted face candidate area is found and the area surrounded by the ellipse may be used as the face area. Furthermore, the face area may be extracted by using a neural network described in Japanese Unexamined Patent Publication Nos. 5(1993)-274438 and 5(1993)-307605, for example.

The density calculating means 42 calculates an average of the pixel values in the face area extracted by the face extracting means 41 as the face area density tface.

When the AE processing is carried out, the sense of contrast C0 input to the processing means 2 represents the distribution width of the histogram Hus quantified as in the first embodiment.

Figure 20A:
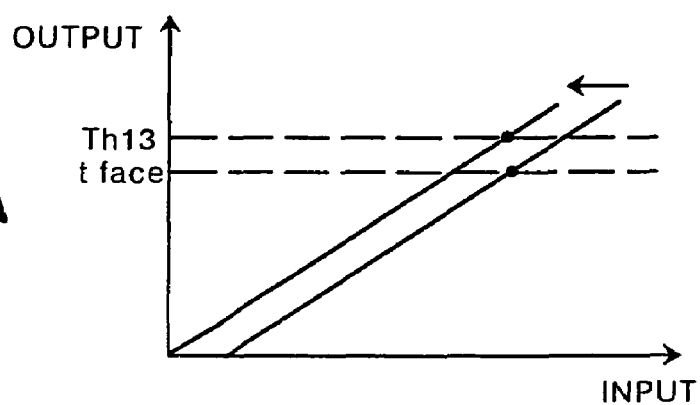
FIGS. 20A and 20B explain the AE processing.

The face extracting means 41 extracts the face area from the image represented by the image data S0 and the density calculating means 42 calculates the density tface of the face area. The AE processing means 43 carries out the AE processing on the image data S0 based on the sense of contrast C0 and the density tface of the face area. In the AE processing means, after the AE processing is carried out on the entire image data S0, further AE processing is then carried out only on the face area in order to change the density of the face adequately. FIG. 20 is a diagram explaining the AE processing. In the AE processing means 43, the sense of contrast C0 is compared with predetermined threshold values Th12 and Th14 (Th12<Th14). If C0<Th12, the image is judged to be a low-contrast image and the density tface of the face area is compared with a predetermined threshold value Th13. If tface<Th13, the face is judged to be too dark and the AE processing is carried out on the image data S0 so that the density tface of the face area agrees with Th13 as shown in FIG. 20(a). In this manner, the processed image data S1 are obtained.

If C0<Th12 and tface≧Th13, the brightness of the face area is judged to be adequate and the AE processing is not carried out.

If C0≧Th12 and tface<Th13, the sense of contrast C0 is judged to be adequate but the face area is judged to be too dark. Therefore, the processed image data S1 are obtained by carrying out the AE processing on the image data S0 in order to cause the density tface of the face area to become equal to (Th13+tface)/2.

If C0≧Th12 and tface≧Th13, the brightness of the face area is judged to be adequate and no AE processing is carried out.

Figure 20B:
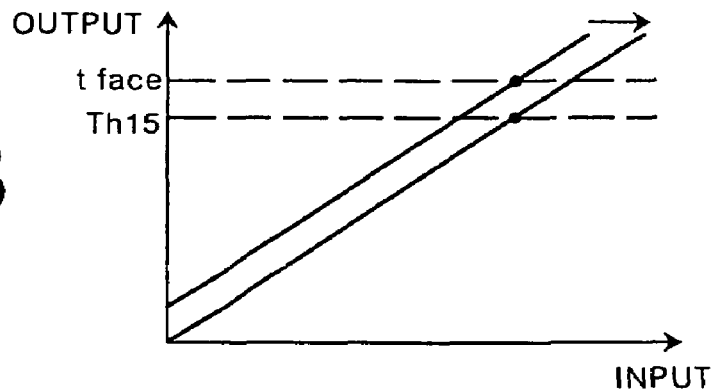

Meanwhile, if C0>Th14, the image is judged to be a high-contrast image and the density tface of the face area is compared with a predetermined threshold value Th15. If tface>Th15, the face area is judged to be too bright and the AE processing for causing the density tface of the face area to agree with the threshold value Th15 is carried out, as shown in FIG. 20(b). In this manner, the processed image data S1 are obtained. In this case, it is preferable for the AE processing to be carried out only on the face area.

If C0>Th14 and tface≦Th15, the brightness of the face area is judged to be adequate and the AE processing is not carried out.

If C0≦Th14 and tface>Th15, the sense of contrast C0 is judged to be adequate but the face area is judged to be too bright. Therefore, the AE processing for causing the density tface of the face area to become equal to (Th15+tface)/2 is carried out on the image data S0. In this manner, the processed image data S1 are obtained.

If C0≦Th14 and tface≦Th15, the brightness of the face area is judged to be adequate and no AE processing is carried out.

In the third embodiment described above, if σ<Th15, the image is judged to be a flash image having a face area reflecting the light, and the AE processing for causing the density tface of the face area to become smaller may be carried out.

In the embodiments described above, the processing means 2 carries out the tone conversion processing, the chroma conversion processing, frequency enhancing processing or the AE processing. However, these kinds of processing may be used in combination, such as the tone conversion processing and the AE processing. Furthermore, various kinds of processing other than those described above may be used.

Figure 21:
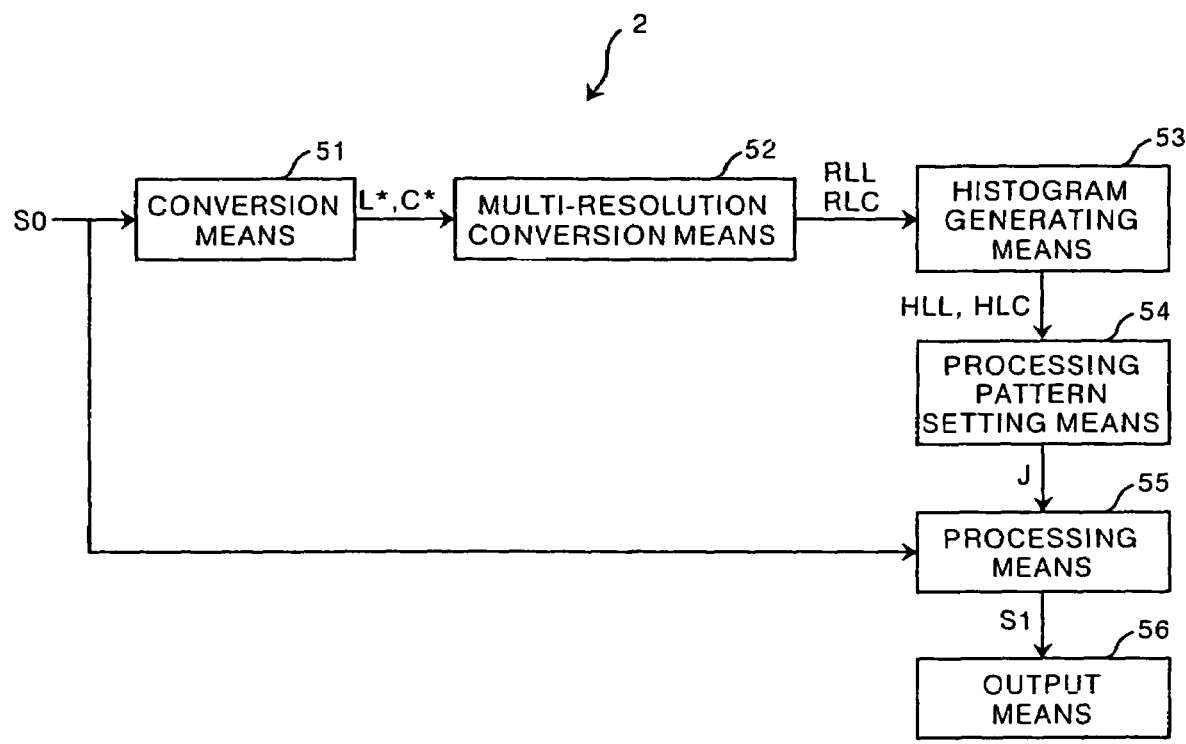
FIG. 21 is a block diagram showing an outline configuration of the image processing apparatus according to another embodiment of the present invention.

Another embodiment of the present invention will be explained next. FIG. 21 is a block diagram showing an outline configuration of an image processing apparatus according to the embodiment. As shown in FIG. 21, the image processing apparatus comprises conversion means 51 for converting the image data S0 into the luminance data L* and the color data C* as the conversion means 15 in the second embodiment, multi-resolution conversion means 52 for obtaining the luminance resolution data RLL, RML, and RHL and the color resolution data RLC, RMC and RHC in the low, medium and high frequency bands by carrying out multi-resolution conversion on the luminance data L* and on the color data C*, histogram generating means 53 for generating the luminance histogram HLL of the luminance resolution data RLL in the low frequency band and the color histogram HLC of the color resolution data RLC in the low frequency band, pattern setting means 54 for setting a pattern J for image processing to be carried out on the image data S0 based on the luminance histogram HLL and the color histogram HLC, processing means 55 for obtaining the processed image data S1 by carrying out image processing on the image data S0 according to the pattern J having been set, and output means 56 for outputting the processed image data S1 as a visible image.

In the case where the color data C* can be obtained as chroma, the color histogram HLC in one dimension is generated. Meanwhile, the color histogram HLC in two dimensions as shown in FIG. 10 is generated in the case where the color data are obtained as a* and b*.

In the processing pattern setting means 54, the tone conversion LUT shown in FIG. 6 and a value of the enhancement coefficient αc for improving the chroma C* are set as the processing pattern J. First, characteristic quantities representing the distributions of the luminance histogram HLL and the color histogram HLC are found from the histograms. The distribution width of the luminance histogram HLL is used as a characteristic quantity P1. If the color histogram HLC is one-dimensional, the distribution width thereof is used as a characteristic quantity P2 while a distribution area of the color histogram HLC is used as P2 if the color histogram HLC is two-dimensional. The characteristic quantity P2 is then compared with a predetermined threshold value Th16. If P2≧Th16, the tone conversion LUT3 is selected for the tone conversion from the tone conversion LUTs shown in FIG. 6, and the coefficient αc is set to 1.0.

Meanwhile, if P2<Th16, the characteristic quantity P1 found from the luminance histogram HLL is compared with a predetermined threshold value Th17. If P1≧Th17, the image is judged to be a high-contrast image. The LUT5 is selected and αc is set to 1.0. If P1<Th17, the image is judged to be a low-contrast image, and the LUT1 and αc=1.2 are set.

The image processing is carried out by the processing means 55 according to the processing pattern J set in the above manner.

Figure 22:
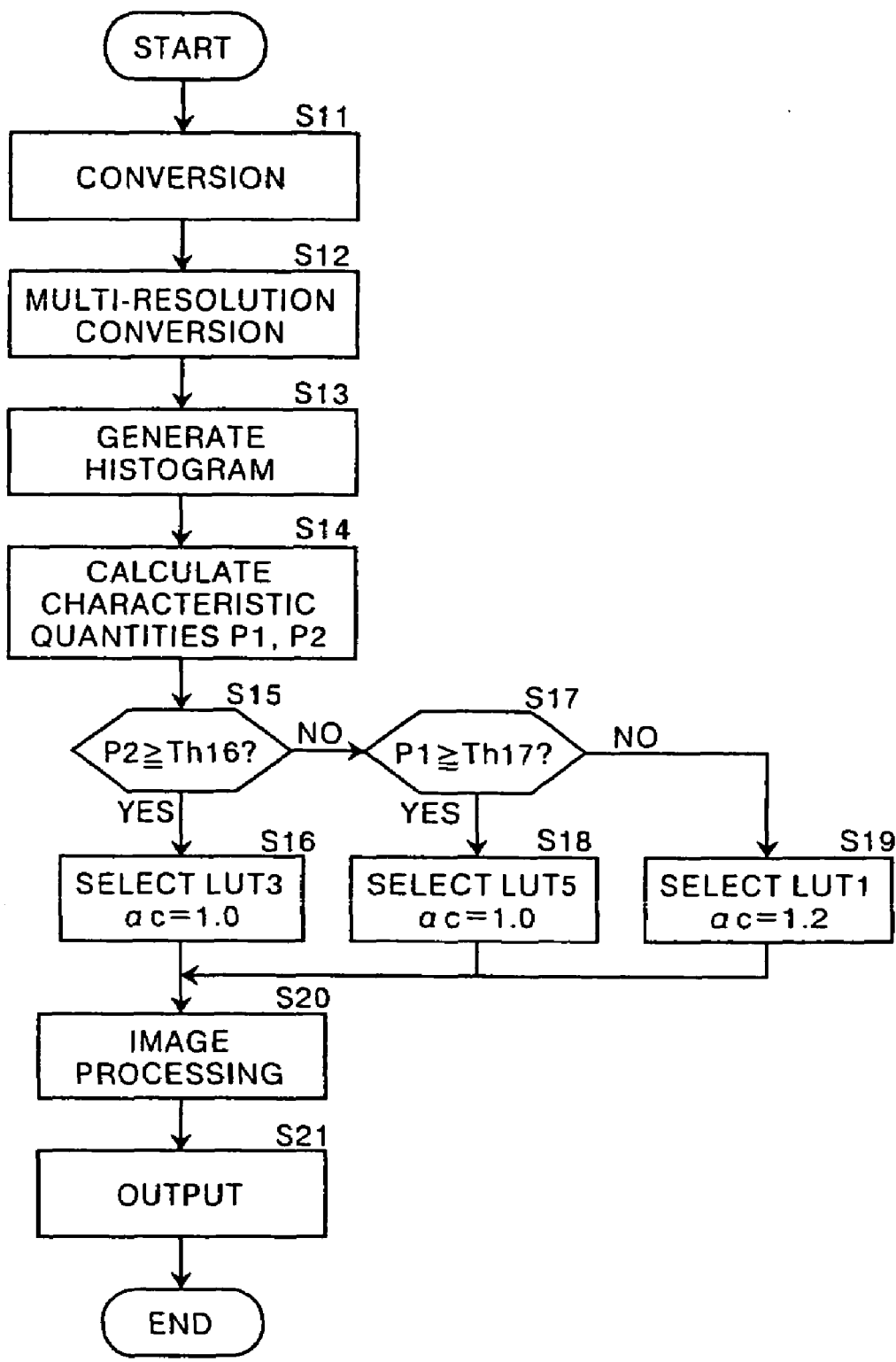
FIG. 22 is a flow chart showing processing carried out in the embodiment.

An operation of this embodiment will be explained next. FIG. 22 is a flow chart showing the operation of this embodiment. In the conversion means 51, the image data S0 are converted into the luminance data L* and the color data C* (Step S11). In the multi-resolution conversion means 52, the luminance data L* and the color data C* are converted into multiple resolutions and the luminance resolution data RLL, RML, and RHL and the color resolution data RLC, RMC, and RHC in the low, medium, and high frequency bands are obtained (Step S12). In the histogram generating means 53, the luminance histogram HLL and the color histogram HLC are generated from the luminance resolution data RLL and the color resolution data RLC in the low frequency band (Step S13).

The characteristic quantities P1 and P2 of the luminance histogram HLL and the color histogram HLC are respectively calculated (Step S14), and whether or not P2≧Th16 is satisfied is judged (Step S15). If the judgment result at Step S15 is confirmative, the tone conversion LUT3 is selected and the enhancement coefficient αc is set to 1.0 (Step S16) to set the processing pattern J. If the judgment result at Step S15 is negative, whether or not P1≧Th17 is judged (Step S17). If the judgment result at Step S17 is affirmative, the LUT5 is selected and the enhancement coefficient αc is set to 1.0 (Step S18) to set the processing pattern J. If the judgment result at Step S17 is negative, the LUT1 is selected and the coefficient αc is set to 1.2 (Step S19). In this manner, the processing pattern J is set and the image processing is carried out on the image data S0 according to the processing pattern J (Step S20) to obtain the processed image data S1. The processed image data S1 obtained in the above manner are output as a visible image by the output means 56 (Step S21).

Figure 23:
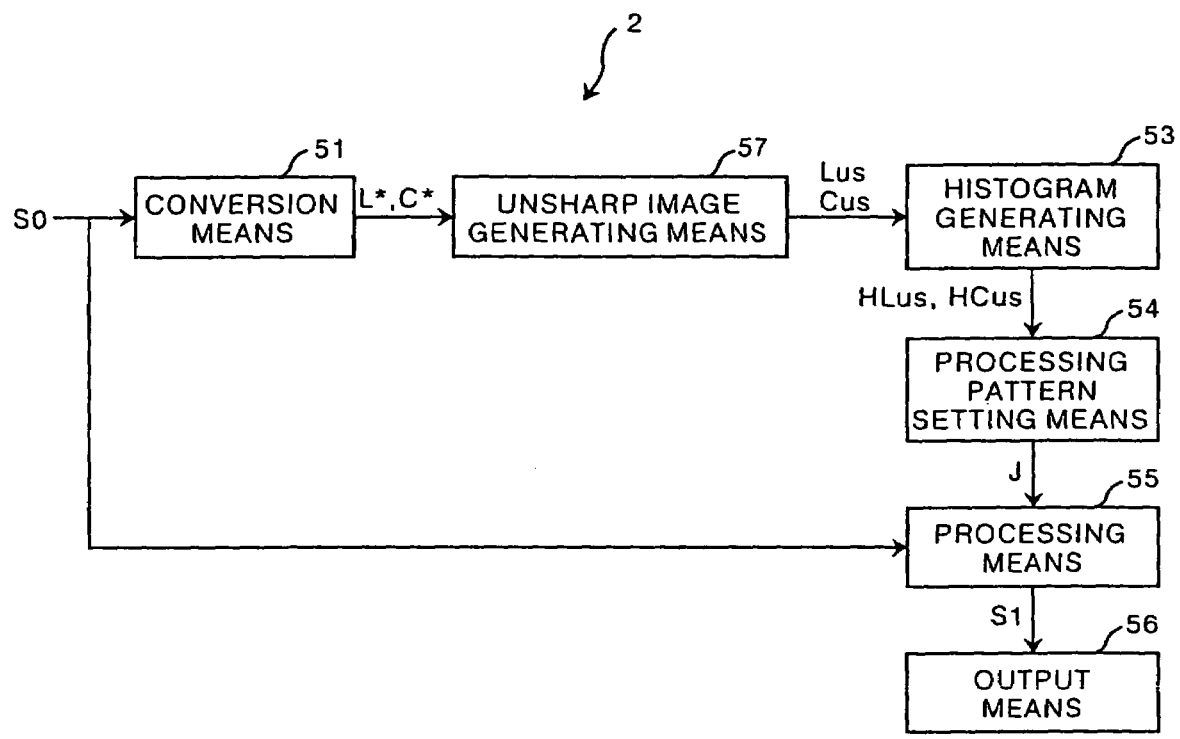
FIG. 23 is a block diagram showing an outline configuration of the image processing apparatus according to still another embodiment of the present invention.

In the above embodiment, the luminance data L* and the color data C* are subjected to multi-resolution conversion and the histogram HLL of the resolution data RLL in the low frequency band and the histogram HLC of the color resolution data RLC in the low frequency band are generated. However, as shown in FIG. 23, unsharp image generating means 57 for generating the unsharp luminance image data Lus and the unsharp color image data Cus which are unsharp image data of the luminance data L* and the color data C* may be used instead of the multi-resolution conversion means 52, and the luminance histogram HLus and the color histogram HCus may be generated from the unsharp luminance image data Lus and the unsharp color image data Cus respectively.

In addition, all of the contents of Japanese Patent Application Nos. 11(1999)-230731 and 2000-173279 are incorporated into this specification by reference.

What is claimed is:

1. An image processing method comprising the step of quantifying a sense of contrast of an image represented by image data, based on the image data, wherein the step of quantifying comprises the steps of:

obtaining luminance data and color data representing luminance information and color information of the image from the image data;

obtaining multi-resolution luminance image data and/or multi-resolution color image data in a plurality of frequency bands by converting the luminance data and/or the color data into multiple resolutions;

generating a luminance histogram and/or a color histogram which are histograms of the multi-resolution luminance image data and/or the multi-resolution color image data in each of the frequency bands; and quantifying the sense of contrast based on the luminance histogram and/or the color histogram in each of the frequency bands.

2. An image processing method as claimed in claim 1, wherein the step of quantifying comprises the steps of:

generating unsharp image data of the image data;

generating a histogram of the unsharp image data; and quantifying the sense of contrast based on the histogram.

3. An image processing method as claimed in claim 1, wherein the step of quantifying comprises the steps of:
   obtaining luminance data and color data representing luminance information and color information of the image from the image data;
   generating unsharp luminance image data and/or unsharp color image data which are unsharp image data of the luminance data and/or the color data;
   generating a luminance histogram and/or a color histogram which are histograms of the unsharp luminance image data and/or the unsharp color image data; and
   quantifying the sense of contrast based on the luminance histogram and/or the color histogram.

4. An image processing method as claimed in claim 3, wherein the step of generating the luminance histogram and/or the color histogram is the step of generating a color histogram representing a two-dimensional frequency distribution of the unsharp color image data in the case where the color image data are generated.

5. An image processing method as claimed in claim 1, wherein the step of quantifying comprises the steps of:
   generating unsharp image data of the image data; and
   quantifying the sense of contrast based on position information of a light portion and/or a dark portion in an unsharp image represented by the unsharp image data.

6. An image processing method comprising the step of carrying out image processing for changing luminance information of an image represented by image data on the image data based on color information of the image, wherein the step of carrying out the image processing comprises the steps of:
   obtaining color data representing the color information from the image data;
   obtaining multi-resolution image data in a plurality of frequency bands by converting the color data into multiple resolutions;
   generating a histogram of multi-resolution image data in a lowermost frequency band out of the multi-resolution image data in the plurality of frequency bands; and
   carrying out the image processing on the image data based on the histogram.

7. An image processing method as claimed in claim 6, wherein the step of carrying out the image processing comprises the steps of:
   obtaining color data representing the color information from the image data;
   generating unsharp image data of the color data;
   generating a histogram of the unsharp image data; and
   carrying out the image processing on the image data based on the histogram.

8. An image processing method as claimed in claim 6, wherein the step of generating the histogram is the step of generating a histogram representing a two-dimensional frequency distribution of the unsharp image data.

9. An image processing method as claimed in claim 6, wherein the step of quantifying comprises the steps of:
   setting a pattern for image processing to be carried out on the image data based on the color histogram.

10. An image processing apparatus comprising contrast-sense quantification means for quantifying a sense of contrast of an image represented by image data, based on the image data, wherein the contrast-sense quantification means comprises:
    conversion means for obtaining luminance data and color data representing luminance information and color information of the image from the image data;
    multi-resolution conversion means for obtaining multi-resolution luminance image data and/or multi-resolution color image data in a plurality of frequency bands by converting the luminance data and/or the color data into multiple resolutions;
    histogram generating means for generating a luminance histogram and/or a color histogram which are histograms of the multi-resolution luminance image data and/or the multi-resolution color image data in each of the frequency bands; and
    quantification means for quantifying the sense of contrast based on the luminance histogram and/or the color histogram in each of the frequency bands.

11. An image processing apparatus as claimed in claim 10, wherein the contrast-sense quantification means comprises:
    unsharp image data generating means for generating unsharp image data of the image data;
    histogram generating means for generating a histogram of the unsharp image data; and
    quantification means for quantifying the sense of contrast based on the histogram.

12. An image processing apparatus as claimed in claim 10, wherein the contrast-sense quantification means comprises:
    conversion means for obtaining luminance data and color data representing luminance information and color information of the image from the image data;
    unsharp image data generating means for generating unsharp luminance image data and/or unsharp color image data which are unsharp image data of the luminance data and/or the color data;
    histogram generating means for generating a luminance histogram and/or a color histogram which are histograms of the unsharp luminance image data and/or the unsharp color image data; and
    quantification means for quantifying the sense of contrast based on the luminance histogram and/or the color histogram.

13. An image processing apparatus as claimed in claim 12, wherein the histogram generating means generates a color histogram representing a two-dimensional frequency distribution of the unsharp color image data in the case where the unsharp image data generating means generates the unsharp color image data.

14. An image processing method as claimed in claim 10, wherein the contrast-sense quantification means comprises:
    unsharp image data generating means for generating unsharp image data of the image data; and
    quantification means for quantifying the sense of contrast based on position information of a light portion and/or a dark portion in an unsharp image represented by the unsharp image data.

15. An image processing apparatus which carries out image processing on image data for changing luminance information of an image represented by the image data, based on color information of the image, comprising:
    conversion means for obtaining color data representing the color information of the image from the image data;
    multi-resolution conversion means for obtaining multi-resolution image data in a plurality of frequency bands by converting the color data into multiple resolutions;
    histogram generating means for generating a histogram of multi-resolution image data in a lowermost frequency band out of the multi-resolution image data in the plurality of frequency bands; and
    processing means for carrying out the image processing on the image data based on the histogram.

16. An image processing apparatus as claimed in claim 10, comprising:

conversion means for obtaining color data representing the color information of the image from the image data;

unsharp image generating means for generating unsharp image data of the color data;

histogram generating means for generating a histogram of the unsharp image data; and processing means for carrying out the image processing on the image data based on the histogram.

17. An image processing apparatus as claimed in claim 16, wherein the histogram generating means generates a histogram representing a two-dimensional frequency distribution of the unsharp image data.

18. An image processing apparatus as claimed in claim 15, wherein the step of quantifying comprises the step of:

pattern setting means for setting a pattern for image processing to be carried out on the image data based on the color histogram.

19. A computer-readable recording medium storing a program to cause a computer to execute an image processing method comprising the procedure of quantifying a sense of contrast of an image represented by image data, based on the image data, wherein the procedure of quantifying the sense of contrast comprises the procedures of:

obtaining luminance data and color data representing luminance information and color information of the image from the image data;

obtaining multi-resolution luminance image data and/or multi-resolution color image data in a plurality of frequency bands by converting the luminance data and/or the color data into multiple resolutions;

generating a luminance histogram and/or a color histogram which are histograms of the multi-resolution luminance image data and/or the multi-resolution color image data in each of the frequency bands; and quantifying the sense of contrast based on the luminance histogram and/or the color histogram in each of the frequency bands.

20. A computer-readable recording medium as claimed in claim 19, wherein the procedure of quantifying the sense of contrast comprises the procedures of:

generating unsharp image data of the image data;

generating a histogram of the unsharp image data; and quantifying the sense of contrast based on the histogram.

21. A computer-readable recording medium as claimed in claim 19, wherein the procedure of quantifying the sense of contrast comprises the procedures of:

obtaining luminance data and color data representing luminance information and color information of the image from the image data;

generating unsharp luminance image data and/or unsharp color image data which are unsharp image data of the luminance data and/or the color data;

generating a luminance histogram and/or a color histogram which are histograms of the unsharp luminance image data and/or the unsharp color image data; and quantifying the sense of contrast based on the luminance histogram and/or the color histogram.

22. A computer-readable recording medium as claimed in claim 19, wherein the procedure of generating the luminance histogram and/or the color histogram is the step of generating a color histogram representing a two-dimensional frequency distribution of the unsharp image data in the case where the color image data are generated.

23. A computer-readable recording medium as claimed in claim 19, wherein the procedure of quantifying the sense of contrast comprises the procedures of:

generating unsharp image data of the image data; and quantifying the sense of contrast based on position information of a light portion and/or a dark portion in an unsharp image represented by the unsharp image data.

24. A computer-readable recording medium storing a program to cause a computer to execute an image processing method for carrying out image processing for changing luminance information of an image represented by image data on the image data, based on color information of the image, wherein the program comprises the procedures of:

obtaining color data representing the color information from the image data;

obtaining multi-resolution image data in a plurality of frequency bands by converting the color data into multiple resolutions;

generating a histogram of multi-resolution image data in a lowermost frequency band out of the multi-resolution image data in the plurality of frequency bands; and carrying out the image processing on the image data based on the histogram.

25. A computer-readable recording medium as claimed in claim 24, wherein the program comprises the procedures of:

obtaining color data representing the color information from the image data;

generating unsharp image data of the color data;

generating a histogram of the unsharp image data; and carrying out the image processing on the image data based on the histogram.

26. A computer-readable recording medium as claimed in claim 25, wherein the procedure of generating the histogram is the procedure of generating a histogram representing a two-dimensional frequency distribution of the unsharp image data.

27. A computer-readable recording medium as claimed in claim 24, wherein the step of quantifying comprises the step of:

setting a pattern for image processing to be carried out on the image data based on the color histogram.

* * * * *